United States Patent
Zaencker

(10) Patent No.: US 8,885,485 B2
(45) Date of Patent: *Nov. 11, 2014

(54) GENERATION OF DIAGNOSTIC DATA FROM INTERARRIVAL TIMES OF VOIP PACKETS

(75) Inventor: Olaf Carl Zaencker, Hamburg (DE)

(73) Assignee: VoIPFuture, GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/063,971

(22) PCT Filed: Jul. 31, 2006

(86) PCT No.: PCT/EP2006/064862
§ 371 (c)(1),
(2), (4) Date: Feb. 15, 2008

(87) PCT Pub. No.: WO2007/020182
PCT Pub. Date: Feb. 22, 2007

(65) Prior Publication Data
US 2008/0186872 A1    Aug. 7, 2008

(30) Foreign Application Priority Data
Aug. 15, 2005 (DE) .......................... 10 2005 039 192

(51) Int. Cl.
*G01R 31/08* (2006.01)
*H04L 1/24* (2006.01)
*H04L 1/20* (2006.01)
*H04L 12/26* (2006.01)
*H04M 7/00* (2006.01)

(52) U.S. Cl.
CPC *H04L 1/24* (2013.01); *H04L 1/205* (2013.01); *H04L 43/045* (2013.01); *H04L 43/0823* (2013.01); *H04M 7/0084* (2013.01); *H04M 2201/12* (2013.01)

USPC .......................................................... 370/244

(58) Field of Classification Search
CPC . H04L 12/2602; H04L 43/00; H04L 43/0829; H04L 65/80; H04L 43/087; H04L 43/106; H04L 43/0852; H04M 3/2236
USPC ................................. 370/252, 241, 242, 352
See application file for complete search history.

(56) References Cited

U.S. PATENT DOCUMENTS 5,343,465 A * 8/1994 Khalil ............................ 370/232
5,600,632 A * 2/1997 Schulman ..................... 370/252

(Continued)

OTHER PUBLICATIONS

Jeffrey Feigin and Kaveh Pahlaven, "Measurement of characteristics of Voice over IP in a wireless LAN environment," Mobile Multimedia Communications, 1999 IEEE Int'l Workshop, ISBN 0-7803-5904-6 (Nov. 1999).

*Primary Examiner* — Luat Phung
(74) *Attorney, Agent, or Firm* — Hugh P. Gortler

(57) ABSTRACT

Disclosed is a method for analyzing errors of a data stream, particularly a real-time data stream, in a data network (100). According to said method, a time stamp and/or a sequence number is/are determined from or for each data packet transmitted between two communication terminals (10, 12) of the data network (100), a history (diagram) and/or a frequency distribution (histogram) of at least one data transmission parameter determined from the plurality of time stamps and/or sequence numbers of the data packets of the data stream is generated, and a pattern of the history and/or the frequency distribution of the at least one data transmission parameter is identified in order to determine the location and/or the cause of an error during the transmission of the data stream in the data network.

43 Claims, 25 Drawing Sheets

(56) References Cited

U.S. PATENT DOCUMENTS

| | | | |
|---|---|---|---|
| 6,577,648 B1* | 6/2003 | Raisanen et al. | 370/503 |
| 6,580,694 B1* | 6/2003 | Baker | 370/252 |
| 2002/0091495 A1* | 7/2002 | Woodroffe | 702/122 |
| 2003/0069018 A1* | 4/2003 | Matta et al. | 455/436 |
| 2003/0128692 A1 | 7/2003 | Mitsumori et al. | |
| 2005/0094628 A1* | 5/2005 | Ngamwongwattana et al. | 370/352 |
| 2005/0220088 A1* | 10/2005 | Smith et al. | 370/352 |
| 2007/0104105 A1 | 5/2007 | MeLampy et al. | |
| 2008/0117930 A1* | 5/2008 | Chakareski et al. | 370/465 |

* cited by examiner

GENERATION OF DIAGNOSTIC DATA FROM INTERARRIVAL TIMES OF VOIP PACKETS

A method for fault analysis of a data stream, particularly a real-time data stream, in a data network, communication system and supervisory computer The invention concerns a method of analyzing errors in a data stream, particularly a real-time data stream, in a data network. The invention furthermore concerns a communication system with a supervisory computer for analyzing a data stream, particularly a real-time data stream, between communication devices in a data network as well as supervisory computer.

Multimedia-based communication via communication networks using the Internet Protocol (IP), in which different real-time media (data, audio and video) is transported in parallel, is persistently gaining in significance. For the transmission of real-time data (audio and video data) via IP communication networks the protocols designed for data communication can no longer be employed, because due real-time communication error checking with acknowledgements, for example, as is the case with conventional data communication, is not possible. Furthermore, with the method designed for data communication it is not possible for real-time communication to detect significant isochrony or the deviation from it.

Communication systems that communicate using the Voice over IP (VoIP) standard are, due to their complexity, very susceptible to interference with respect to the speech quality to be achieved. Data transfer between two communication devices (IP soft clients, IP phones, gateways, MCUs, etc.) is done on the basis of packets in accordance with the Realtime Transport Protocol (RTP; see RFC 3550/1). RTP is used to transport multimedia data streams such as audio, video, text, etc. as well signaling information over networks, i.e. to code, packetize and isochronically send the data. The function of RTP mainly consists of transferring real-time sensitive data. An RTP data packet primarily consists of a header with a version and sequence number, the data format (information about codec used), the sender ID (SSRC), an RTP timestamp, as well as the payload.

RTP is a protocol specially developed for the use case of real-time communication. RTP assigns a consecutive sequence number to the real-time data packets being transferred in order for the correct sequence and their integrity to be identified by the receiver. The real-time data packets also contain a sender-side RTP timestamp in order to determine the time points in which the individual audio and video blocks were generated. They are, however, unsuitable for the evaluation of temporal behavior at the place of measurement/reception for lack of adequate precision and due to the fact that they only represent the situation at the point in time that the data was generated and can neither take into account sender-side influences after leaving the RTP stack up to being transferred over the network interface nor the influences of transmission over a data transmission network.

Faults or errors of the communication system can occur in the sending communication device or the communication transmission network transmitting the real-time data packets. Reasons for the faults can include: the RTP stack in the sending communication device, the operating system of the sending communication device, the configuration of the sending communication device, the bandwidth of the data transmission network transmitting the real-time data stream, the buffer in the active network components of the data transmission network transmitting the real-time data stream, etc. A combination of one or more of the errors mentioned above may also be the cause for a fault.

The process of troubleshooting and debugging presents itself in practice as being extremely time-consuming and thus costly. In some cases it is not even possible to track down the error which may ultimately result in non-availability of the communication system.

Currently used error analyses are generally based on the interpretation of RTCP (Realtime Transport Control Protocol; also see RFC 3550) reports transmitted in, e.g. 5-second intervals. The reports are generated by the receiving communication device and transmitted as feedback to the sending communication device, where an aggregation of data of up to 500 real-time packets is done. Through this method-dependent aggregation and calculation of the parameters transmitted in the RTCP reports over the entire, e.g. 5-second, interval, the parameters in part deviate strongly from the actual states (e.g. actual temporal progression/real variance of the temporal progression) in the communication transmission network or provide a false picture. An error analysis of the real-time data stream in the data network is thus only possible in an unsatisfactory way.

It is therefore the task of the present invention to specify a method for error analysis of a data stream, particularly a real-time data stream, in a data network which enables the reliable identification of an error (such as the type of error, place where the error occurred). It is furthermore the task of the present invention to specify a communication system as well as a supervisory computer which enable the error analysis of the data stream in a data network.

In the method for error analysis of a data stream in a data network disclosed by the present invention, particularly a real-time data stream, a timestamp and/or a sequence number is obtained and/or generated from each and every data packet transmitted between two communication devices on the data network to solve this task. The temporal progression (diagram) and/or frequency distribution (histogram) of at least one data transmission parameter is generated, calculated from multiple timestamps and/or sequence numbers of the data packets in the data stream. Finally, pattern recognition of temporal progression and/or frequency distribution of at least one data transmission parameters is undertaken to determine the place and/or the cause of an error in transmitting the data stream in the data network.

The communication system disclosed by the present invention comprises a supervisory computer for analyzing errors in a data stream, particularly a real-time data stream, between two communication devices on a data network, which is designed to identify an RTP timestamp and/or a sequence number from each of the data packets transmitted between two communication devices on the data network and optionally insert its own measurement timestamp at the time measurement is done. The supervisory computer is furthermore designed to generate a temporal progression and/or a frequency distribution of at least one data transmission parameter, calculated from multiple timestamps and/or sequence numbers of the data packets in the data stream. Furthermore, the supervisory computer is designed to do pattern recognition of the temporal progression and/or frequency distribution of at least one data transmission parameter to determine the place and/or the cause of an error in transmitting the data stream in the data network.

A supervisory computer disclosed by the present invention for analyzing the errors of a data stream between two communication devices on a data network is designed to obtain an RTP timestamp and/or a sequence number from each data packet transmitted between two communication devices on the data network, optionally generate a measurement timestamp indicating the status at the place of measurement, generate a temporal progression and/or frequency distribution of at least one data transmission parameter, calculated from multiple timestamps and/or sequence numbers of the data packets in the data stream, and undertake pattern recognition of the temporal progression and/or frequency distribution of at least one data transmission parameter in order to determine the place and/or the cause of an error in transmission of the data stream on the data network.

The underlying tasks are furthermore solved by a computer program product that can be loaded directly into the internal memory of a digital computer and comprises software code excerpts used to carry out the steps of the method disclosed by the present invention when the product runs on a computer.

The computer program product stored on a computer-compatible media comprises computer-readable program code that enable the computer to obtain an RTP timestamp and/or a sequence number from every data packet being transferred between two communication devices on a data network and to generate a measurement timestamp recording the status at the place of measurement. Furthermore, it comprises computer-readable program code that enable a computer to generate a temporal progression (diagram) and/or frequency distribution (histogram) of at least one data transmission parameter, calculated from multiple timestamps and/or sequence numbers of the data packets in the data stream. Furthermore, it comprises computer-readable program code that enables a computer to carry out pattern recognition of the temporal progression and/or frequency distribution of at least one data transmission parameter in order to determine the place and/or the cause of an error in transmitting the data stream in the data network.

In contrast to the known, state-of-the-art analysis method the invention is not based on an aggregation of the data from multiple data packets, but on the evaluation of at least one data transmission parameter obtained by taking into account the timestamp and/or sequence number of every data packet of the data stream. The visualization of at least one data transmission parameter in a temporal progression and/or a frequency distribution enables the recognition of characteristic patterns in the diagrams or histograms. This allows very accurate error analysis, permitting both an assertion about the place the error occurred, e.g. in the sending communication device or the data transmission network transmitting the data stream, as well as the cause of the error in transmitting the data stream.

The RTP timestamp of an RTP data packet (according to RFC 3550/1) and a measurement timestamp come into consideration here, generated by the supervisory computer upon arrival of a real-time data packet. This thus labels (in contrast to the RTP timestamp labeling the state when data packets are generated) the temporal progression (state) at the place of measurement After being generated a real-time data packet in an RTP stack is already under the influence of the sender operating system, the data transmission network, etc. The pattern recognition disclosed by the present invention enables a measurement timestamp to be applied to isolating an error taking into consideration the components of the data transmission network.

The RTP timestamp is used to mark the time the data packet is generated/the payload is coded. The value of the timestamp may depend on the type of payload. The initial value can for example be selected by a random number generator.

The sequence number of a data packet allows the receiver communication device to identify the loss of data units and reconstruct the correct sequence of the data units should the data packets arrive in the wrong order. The initial value of the sequence number may be selected at random to make unauthorized decoding difficult.

The term "communication device" used in the present application is to be taken generally. The communication device may be communication terminal devices such as IP telephones, computers set up for VoIP (e.g. soft clients), gateways, videoconferencing facilities (MCUs), etc.

Pattern recognition of the temporal progression and/or frequency distribution generated from the data transmission parameters can be accomplished by use of known methods. The can, for example, be done by a comparison of the temporal progressions and/or frequency distributions of the corresponding data transmission parameter stored in a memory, where, for example, a deviation is detected via one or more pre-determined thresholds. The comparison can, for example, be done by converting the frequency distribution of the histogram of the affected data transmission parameter into a data vector that can easily be further dealt with using mathematical methods.

The preferred embodiments of the invention result from each of the independent patent claims.

In a further embodiment of the method disclosed by the present invention the variance in data packet latency time (jitter) and/or the time difference between the measurement timestamp of two consecutive data packets of one data transmission direction (interarrival time, IAT) and/or packet loss and/or time delay of a data packet (delay, roundtrip delay) are taken into consideration as data transmission parameters. The data transmission parameters can in individual cases also be influenced by other data transmission parameters. The IAT is thus influenced by both packet loss as well as by the variance of packet latency time. This means that both IAT histograms as well as IAT time diagrams are always characterized by the interaction of the variance of packet latency time and packet loss. The time difference between the measurement timestamps of two consecutive real-time packets of one data transmission direction is thus an especially advantageous way to provide a comprehensive overview of the quality of the connection between two communication devices. This includes making use of the fact that the communication devices on the data network have an RTP stack and are thus able to transmit RTP data packets in a nearly isochronous pattern. In contrast to this, the components of the data transmission network do not comprise an RTP stack. If the error in data stream transmission is caused by the data transmission network it is no longer able to reconstruct the original time interval of real-time data packets. This insight will be utilized in an advantageous embodiment of the invention for determining the source of the error.

In a further embodiment the data stream contains audio data, particularly Voice-over-IP and/or Comfort Noise (RC 3389, G.729, etc.) Comfort Noise is artificially generated noise used to fill periods of silence in both cellular as well as IP telephony (VoIP) along with a technology to simultaneously suppress all noise below a specific volume level. It produces the illusion of a continuous connection without putting a strain on the necessary bandwidth in the data transmission network for the transmission of the noise.

In a further embodiment of the method disclosed by the present invention the evaluation of the temporal progression and/or the frequency distribution is effected by use of a supervisory computer that detects and further processes the data packets being transmitted between communication devices. The supervisory computer used to obtain data packets can be located anywhere between the communication devices. By selecting the location in which the supervisory computer obtains the data packets transmitted between communication devices the localization of an error that may occur is simplified. It can thus be especially advisable to plan multiple supervisory computers in a sensitive communication system.

A further embodiment of the method disclosed by the present invention envisions the digital mapping of the temporal progression to patterns of at least one data transmission parameter to detect specific errors in the communication devices and to check the data transmission network connecting the communication devices. An alternative or additional embodiment envisions the digital mapping of the frequency distribution to patterns of at least one data transmission parameter to detect specific errors in the communication devices and to check the data transmission network connecting the communication devices. Specific errors that can, for example, be identified are the bandwidth or a buffer store of active network components on the data transmission network. However, it is also possible to identify configuration errors in the sender communication device, the influence of the operating system as well as errors in the RTP stack.

A further embodiment envisions drawing on the digital mappings of diagrams and/or histogram patterns to differentiate between any normal state (e.g. regular VoIP operation, silence suppression according to a standardized method, use of special communication devices such as Voice Response Units) from an error state and the presence of errors attributable to the sending communication device of the data transmission network. This considerably simplifies the rectification of an error.

In further embodiment when an error is determined in the sending communication device by using a temporal progression and/or frequency distribution pattern a specific cause for the error can be ascertained. In particular, the operating system of the communication device, the configuration of the communication device, its RTP stack or the implementation of it come into consideration as the cause of the error.

In further embodiment when an error is determined in the data transmission network by using a temporal progression and/or frequency distribution pattern a specific cause for the error can be ascertained. In particular, a lack of bandwidth or the temporary buffering of active components of the data transmission network come into consideration as the cause of the error.

According to a further preferred embodiment for error detection in the data network it is adequate when doing error analysis of the data stream to analyze the data stream between the two communication devices in one direction or in both directions at one or more places of measurement.

The invention is explained in more detail by means of the following figures. It shows:

FIG. 1 the schematic structure of a communication system disclosed by the present invention FIG. 2-4 two IAT diagrams and an IAT histogram of an ideal VoIP transmission FIG. 5-7 two IAT diagrams and an IAT histogram of a real VoIP transmission FIG. 8-10 an IAT diagram and two IAT histograms of a real VoIP transmission with no packet loss, where one of the communication devices is a Voice Response Unit showing changed behavior FIG. 11-13 two IAT diagrams and one IAT histogram of a real VoIP transmission with no packet loss, but with silence suppression FIG. 14,15 an IAT diagram and an IAT histogram of a real (nearly ideal) VoIP transmission with no packet loss and with very low variance of packet latency (jitter), but with a configuration error in one of the communication devices FIG. 16-18 an IAT diagram and an IAT histogram of a real VoIP transmission with no packet loss and with clearly pronounced variance of packet latency (jitter)

FIG. 19,20 an IAT diagram and an IAT histogram of a real VoIP transmission with no packet loss and with clearly pronounced selective and cyclic jitter in one communication device FIG. 21,22 an IAT diagram and an IAT histogram of a real VoIP transmission with no packet loss and with significantly elevated IAT FIG. 23-25 an IAT diagram, an IAT histogram as well as a packet loss diagram of a real VoIP transmission, in which high IAT values occur as a consequence of frequent packet loss FIG. 1 shows the schematic structure of a communication system (100) disclosed by the present invention. By way of example it simply comprises two communication devices (10, 12) that can communicate with each other over a data transmission network (14). The data transmission network (14) can have multiple network components over which a connection between the communication devices (10, 12) can be established.

The communication devices (10, 12) can, as shown in the example in FIG. 1, represent communication terminal devices designed for communication via one of the Voice over IP standards. The communication devices (10, 12) have an RTP stack so that a data stream flowing between the communication devices (10, 12) can be generated from multiple RTP data packets.

Due to the RTP stack the communication devices (10, 12) are able to transmit the RTP data packets in a nearly isochronous pattern. In contrast, the network components of the data transmission network (15) that are not detailed in FIG. 1 have no RTP stack. When an error in transmission of one or more RTP data packets occurs the data transmission network (14), i.e. the network components involved in the transmission, is no longer able to reconstruct the original time interval of the RTP data packets of the sending communication device (10 or 12). This insight is helpful for the evaluation of error situations by a supervisory computer (16), which in FIG. 1 is, by way of example, located in the data transmission network (14).

The supervisory computer (16) can be located anywhere on a connection line between the communication devices (10, 12). It is especially advantageous if multiple supervisory computers are provided, because this allows the precise localization of an error at significant sections of the data transmission network (14) (e.g. Wide Area Network, uplink, backbone, downlink, end-to-end). In principle it is sufficient if the data stream of one communication direction between the communication devices (10, 12) is monitored by the supervisory computer, where the method disclosed by the present invention can also only be applied to this one direction.

Viewed specifically, the supervisory computer can be viewed as a computer connected in parallel to one of the communication devices (10, 12), which both detects the data packets sent from a sending communication devices via the data transmission network and those received, i.e. data packets sent by the other communication device. In particular, the supervisory computer (16) ascertains the sender-side timestamp (RTP timestamp) and the RTP sequence number from each of the real-time data packets and inserts its own time stamp (measurement timestamp) marking the time of arrival at the supervisory computer. Using these three parameters enables the supervisory computer (16) to ascertain the behavior of the parameters on the sender side as well as the influence of data transmission on the data connection between the communication devices (10, 12).

Of special interest here is the time difference between two consecutive data packets of one data transmission direction, referred to as "Interarrival Time" (IAT). Because the IAT is dependent on both packet loss, ascertainable by the sequence number, as well as the variance in packet latency (known as "jitter"), ascertainable from the timestamps, the IAT data transmission parameter already provides a good overview of the speech quality of a data connection between communication devices (10, 12). The IAT measurement timestamp is of special significance, because it represents the temporal behavior at the place of measurement, thus under the influence of a data transmission network.

A temporal progression and/or a frequency distribution of the individual values of the data transmission parameters is generated from the data transmission parameters identified by the supervisory computer (16). In the following description the term "diagram" is used to refer to the temporal progression and "histogram" is the term used to refer to the frequency distribution of the data transmission parameters of the real-time data packets. Using the temporal progression and/or histogram of one or more data transmission parameters it is possible to differentiate between the normal states of a real-time data connection (specifically a speech connection) and error states. For this purpose the data present in the diagram and the histogram undergoes pattern recognition. This can be accomplished by the supervisory computer itself using known analysis methods or another computer on the data network (100).

The method for error analysis of a data stream being exchanged between the communication devices (10, 12) will be explained in more detail using a number of examples, where only as an example is reference made to the time difference between two consecutive data packets of one data transmission direction at the place of measurement (IAT of the measurement timestamp) in the diagrams and histograms. An error analysis could however also accordingly be done offhand using an analysis of diagrams and/or histograms of jitter, packet loss or time delay (delay, roundtrip delay) of a data packet.

FIG. 2 shows the IAT diagram of an ideal VoIP transmission. All RTP data packets are isochronically transmitted between the communication devices (10, 12), i.e. in the same time interval. The time interval representing the time difference between two consecutive real-time data packets of a data transmission direction is 30 ms for both a communication device referred to in the following as subscriber A and for a communication device referred to as subscriber B. The individual points representing RTP data packets thus have the same IAT, which is plotted on the y-axis. From the selected interval scale in FIG. 2 these appear as continuous, horizontal lines. FIG. 3 shows the same ideal VoIP transmission, where a larger interval scale over the time axis (x-axis) is however selected. In addition to the IAT values of the individual RTP data packets, the associated measurement timestamps (x-axis) now become visible.

FIG. 4 shows the associated IAT histogram, thus the frequency distribution of the individual values of the IAT of the ideal VoIP transmission. Because all RTP data packets between subscribers (A, B) are isochronically transmitted, all time intervals between two consecutive RTP data packets (IAT) are also identical. This results in a vertical line with a frequency value of 100% for the IAT of 30 ms for both communication devices already discernable in diagrams of FIGS. 2 and 3.

This ideal state presented in FIG. 2-4 is at most approximately achieved in practice. It serves as a reference for the evaluation of specific error situations that will be explained in greater detail in the following figures. If an IAT histogram shows only a single vertical line with a level of (nearly) 100% frequency, this is then a VoIP transmission with (nearly) ideal VoIP speech quality, showing no jitter and no packet loss.

FIG. 5 shows the IAT diagram of a real VoIP transmission (with no packet loss and critical jitter) between two IP-compatible communication devices that are connected to the data transmission network via a switch. The differentiation of both technically identical subscribers (A, B) reveals the influence of a single switch in the data transmission network. Subscriber A (at the top) shows a higher variance in IAT after transmission over a switch than is the case with subscriber B (at the bottom). This means that clearly discernable jitter occurs with subscriber A as a consequence of data transmission. For subscriber B, in contrast, the normal behavior (jitter) of an IP-compatible communication device is discernable. The creation of a symmetrical pattern is caused by the time scale of the x-axis. FIG. 6 shows the same real VoIP transmission, where a larger interval of time for the x-axis is however selected. The individual IAT values of the RTP data packets are now clearly discernable, where a deviation from the ideal value of the IAT of 30 ms is apparent for subscriber A.

FIG. 7 shows the IAT histogram, thus the frequency distribution of the individual values of the IAT of the VoIP transmission from FIGS. 5 and 6. Here, too the variance (jitter) already discernable in the IAT diagram can be clearly discerned in the corresponding frequency distribution for subscriber A. The histogram permits a more compact representation compared to the temporal representation of IAT values, in order to arrive at a similar analysis result. Independent from the duration of a VoIP transmission an analysis of virtually the same extent can be done in a single picture while taking into account all IAT values of all data packets. The pattern apparent in FIG. 7 indicates the normal condition with no packet loss and without critical jitter. The lateral offset of the frequency distributions of subscriber A and B can be attributed to the fact that both IP-compatible communication devices (also referred to as endpoints) are sending at different intervals (30 ms and 40 ms). This behavior is can also be immediately discerned in the IAT diagrams in FIGS. 5 and 6.

A normal state of a real VoIP transmission can thus be discerned without problem from an IAT histogram, where this is then present when the IAT histogram shows a clearly accentuated maximum (nominal state of the packet interval when transmitted), without the variance of the frequency values (jitter=lateral expansion of the frequency distribution in comparison to the ideal state) being too high and without other values showing up outside of the frequency distribution. In doing so, the maximum must appear in the value of the interval of RTP packet transmission for each communication device.

FIG. 8 shows the IAT diagram of a real VoIP transmission with no packet loss. A special case exists here in which one of the communication devices comprises a Voice Response Unit (speech computer) with silence suppression according to RFC 3550. In the IAT diagram of FIG. 8 the discontinuous transmission and the strong temporal variance (jitter) during transmission from communication device A as well as the individual packets with higher IAT of both communication devices (A, B) can be seen at the top and bottom edges of the picture. The discontinuous transmission results from silence suppression. The discontinuity of transmission with an ensuing individual RTP data packet showing a high IAT and a set marker bit is characteristic of silence suppression according to RFC 3550 for a uninterrupted ascending sequence of RTP sequence numbers (i.e. no packet loss). The consistently high temporal variance (jitter) of the real-time data packets from communication device A during transmission results from the finite capability of the computer on which the speech synthesis of the Voice Response Unit is carried out. The Voice Response Unit can be clearly discerned by the consistently high temporal variance (jitter) in combination with discontinuous silence suppression). This conclusion is substantiated by the low number of RTP data packets from subscriber B with larger IAT, which contain DTMF tones (signaling) in the RTP data packets for the control of the Voice Response Unit. The length of silent periods corresponds to the response time of a user of the communication device during DTMF input.

FIG. 9 shows the associated IAT histogram. This shows a large variance without significant maximum for subscriber A. FIG. 10 shows the same IAT histogram with a modified scale. The extreme IAT values for subscriber A (due to the periods of silence set with a marker bit) and for subscriber B (due to DTMF input) now become visible. For both subscribers these are not critical values, but rather a desired consequence of a standard feature in a VoIP communication system.

A normal state is thus presented in FIG. 8 to 10 which shows neither packet loss nor critical jitter. The discontinuous transmission (gaps in temporal progression) do not come about from packet loss, but from the regular activity of a Voice Response Unit (waiting for an input). The consistently high temporal variance (jitter) of the signal from subscriber A is for this reason not to be termed critical, because it is not a matter of a regular VoIP endpoint, but a speech computer with finite performance.

If the IAT histogram thus shows large IAT values, with no packet loss being present, it is thus a matter of extreme jitter for these RTP data packets. If these jitter data packets have a set marker bit, it is not a matter of jitter, but silent periods. If on the other side evidence of DTMF entry can be demonstrated at the end of silence suppression in IAT diagrams, this is regular dialog with a Voice Response Unit.

In FIG. 11 to 13 the normal state of a real VoIP transmission is presented with the presence of silence suppression using Comfort Noise (RFC 3389). FIG. 11 shows the IAT diagram of a real VoIP transmission with no packet loss and critical jitter, but with active silence suppression. Silence suppression as described in RFC 3389 is one of several alternative methods for lowering the transmission capacity (bandwidth) in data transmission networks when silent periods (the sender's microphone is not emitting a signal) are present. What can be seen in IAT diagrams is that RTP data packets do not accept just any value, but, like electron shells in the model of an atom, only exhibit a few specific IAT values. RTP data packets arrange themselves along horizontal lines, running in parallel to the ideal state, which can also be overlaid with jitter (hardly at all pronounced in this example). These RTP data packets appearing in parallel lines do not transport speech data, but Comfort Noise in their payload section. This is why they also have RTP payload type 13 defining this method as silence suppression. A similar method, but without its own RTP payload type, is also defined for Codec G.729.

This is also a normal state and no indication of packet loss or critical jitter. The somewhat random distribution of RTP data packets labeled payload type 13 in discrete IAT values is a clear indication of silence suppression.

If an IAT histogram thus reveals discrete values with a large distribution of whole number multiples with no packet loss (which can be determined by the sequence number), this is an indication of silence suppression using Comfort Noise. The associated RTP data packets at the same time have either a special payload type of 13 (RFC 3389) or special lengths of RTP payload (G.729). This information can also be ascertained by the supervisory computer.

Figure 1:
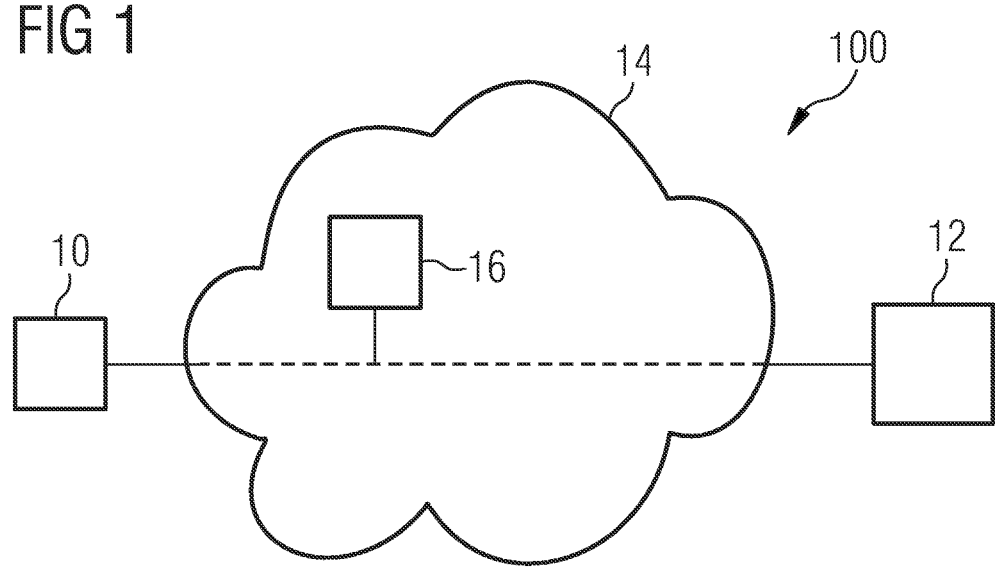
Figure 2:
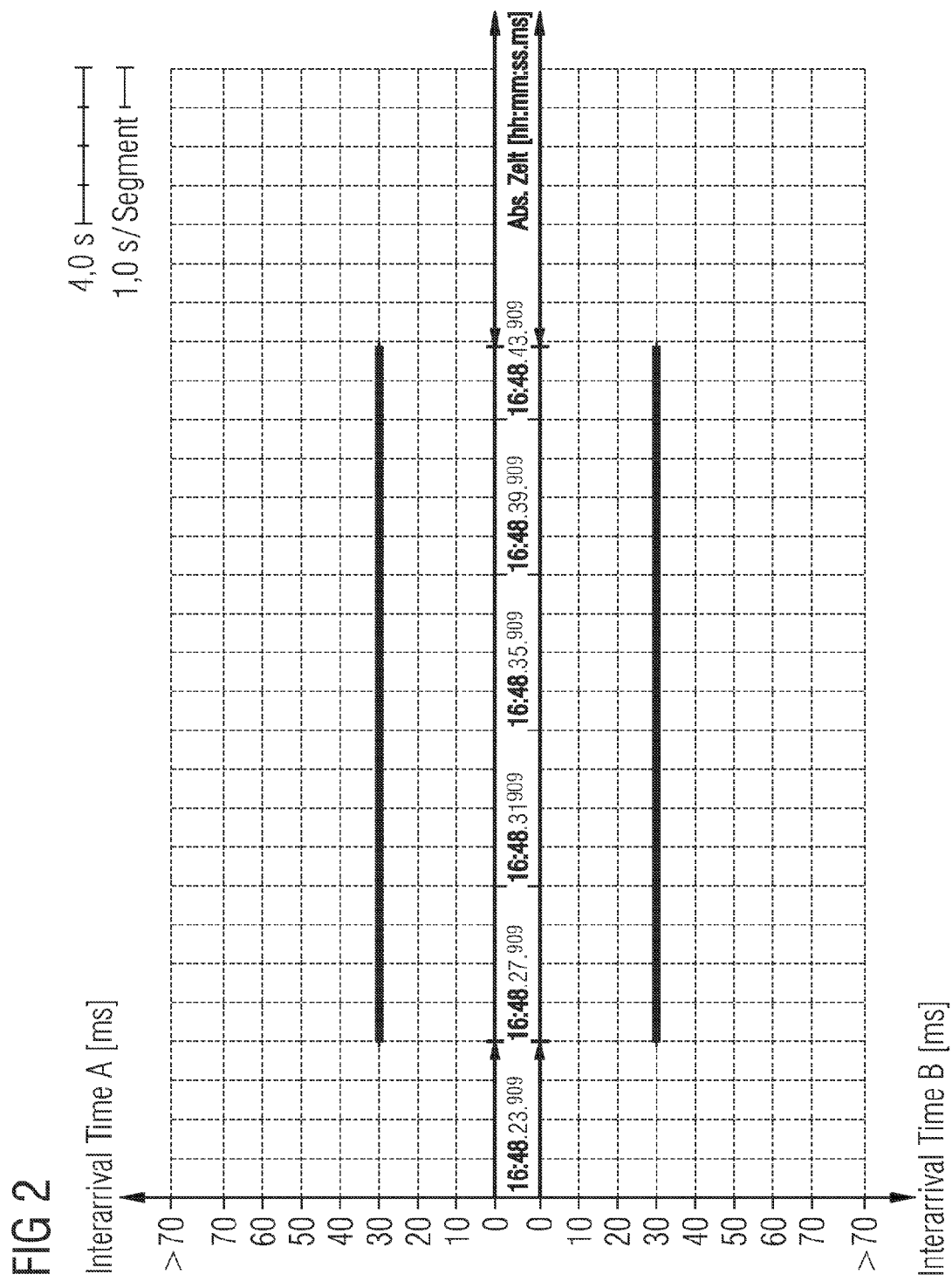
Figure 3:
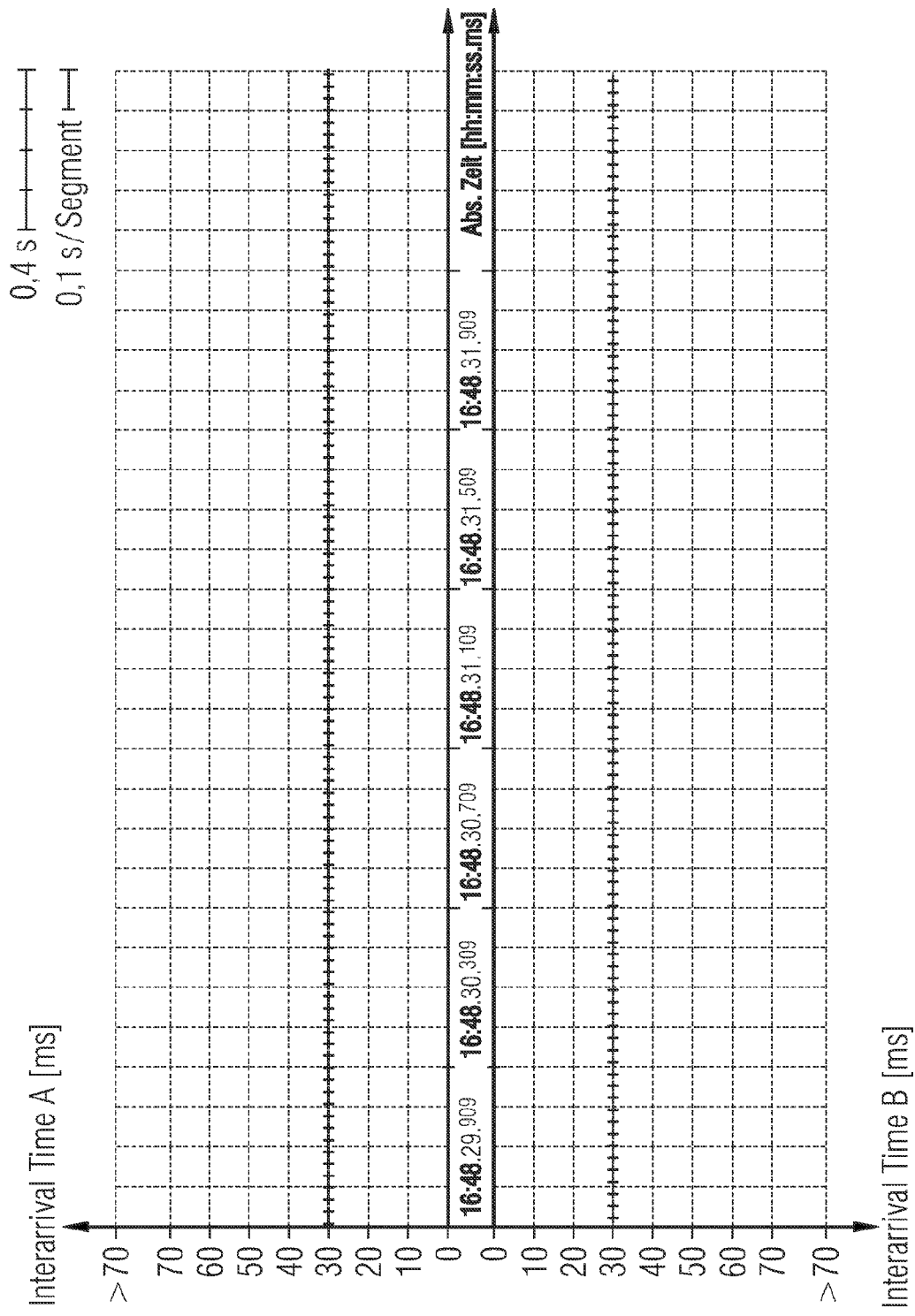
Figure 4:
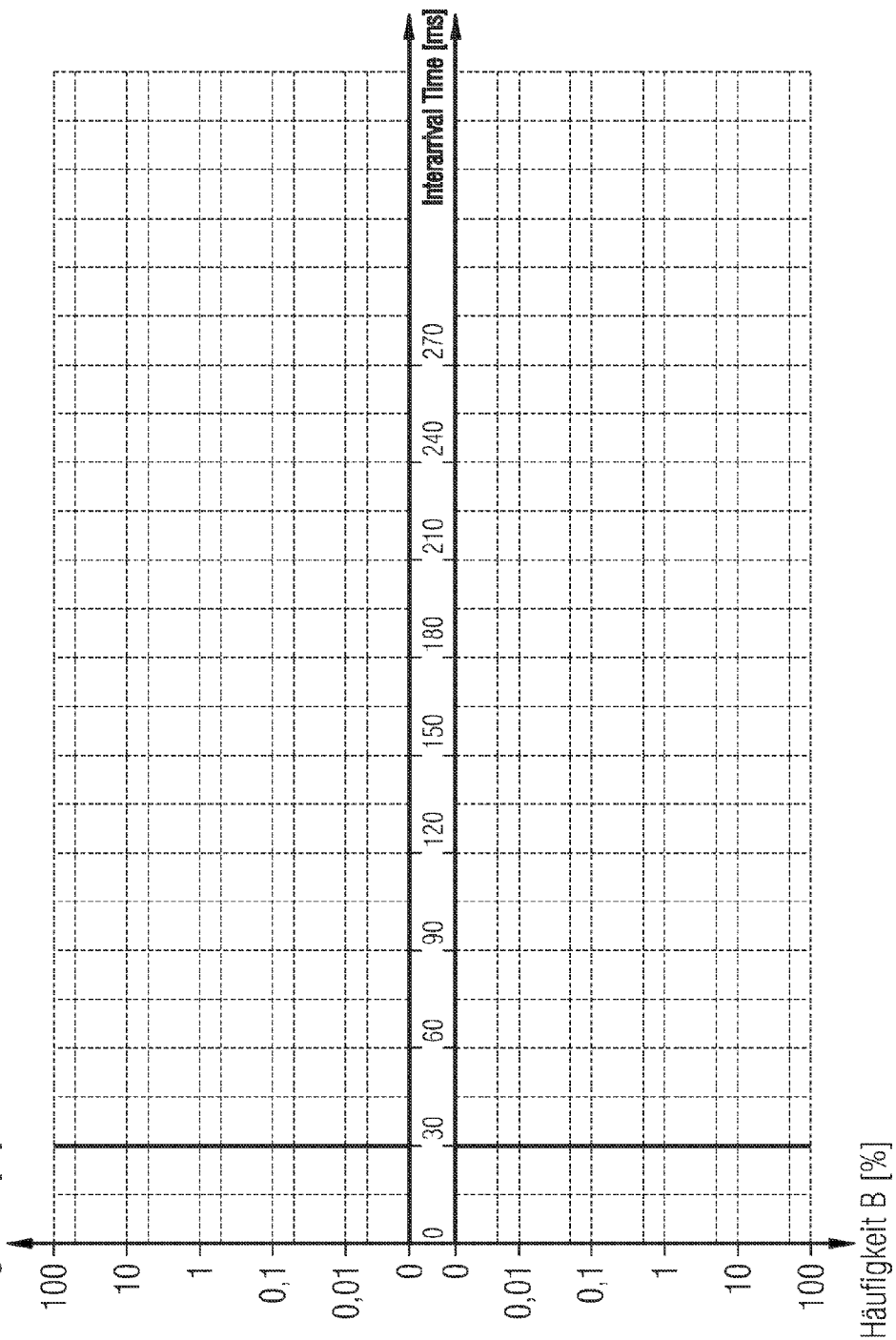
Figure 5:
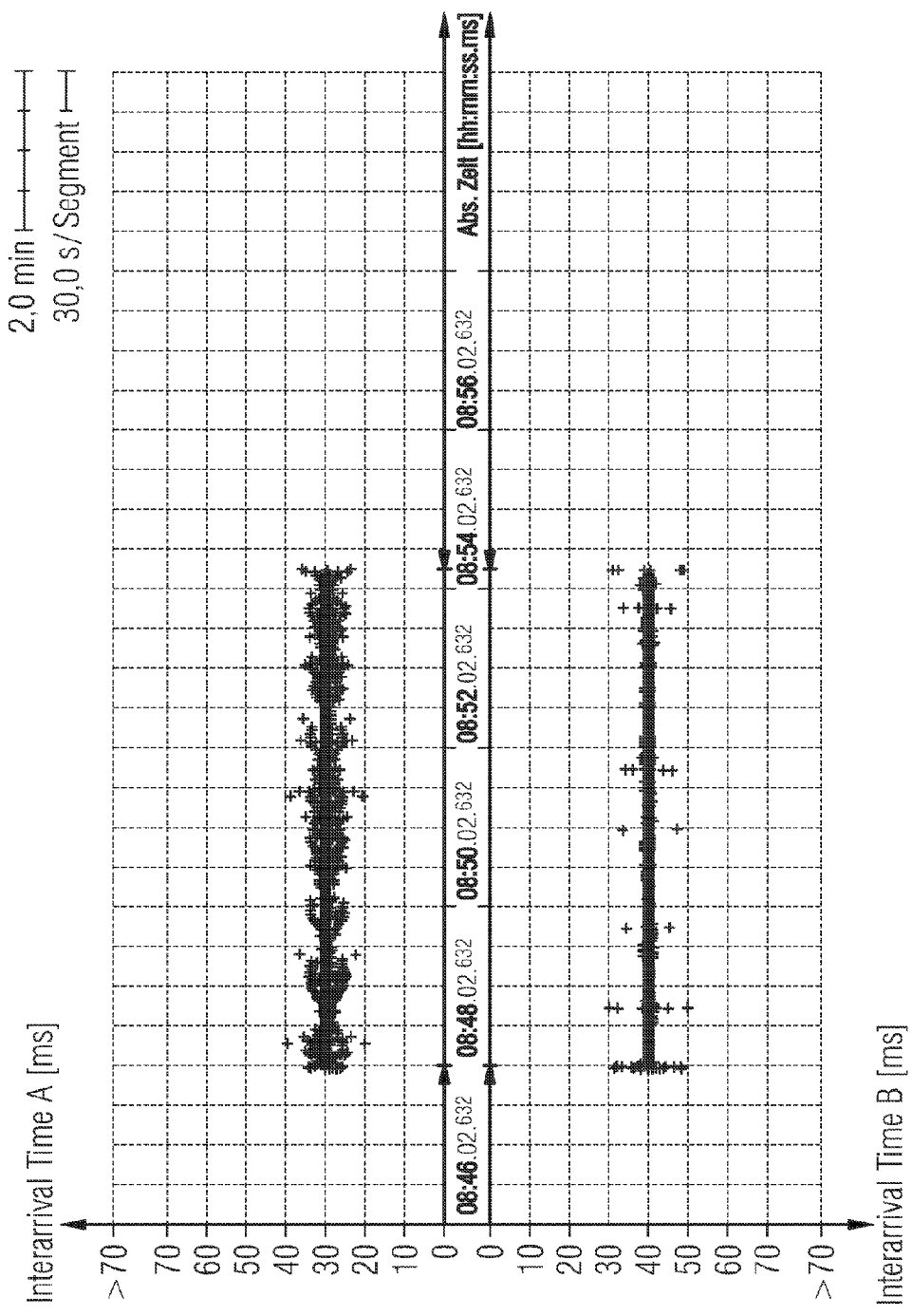
Figure 6:
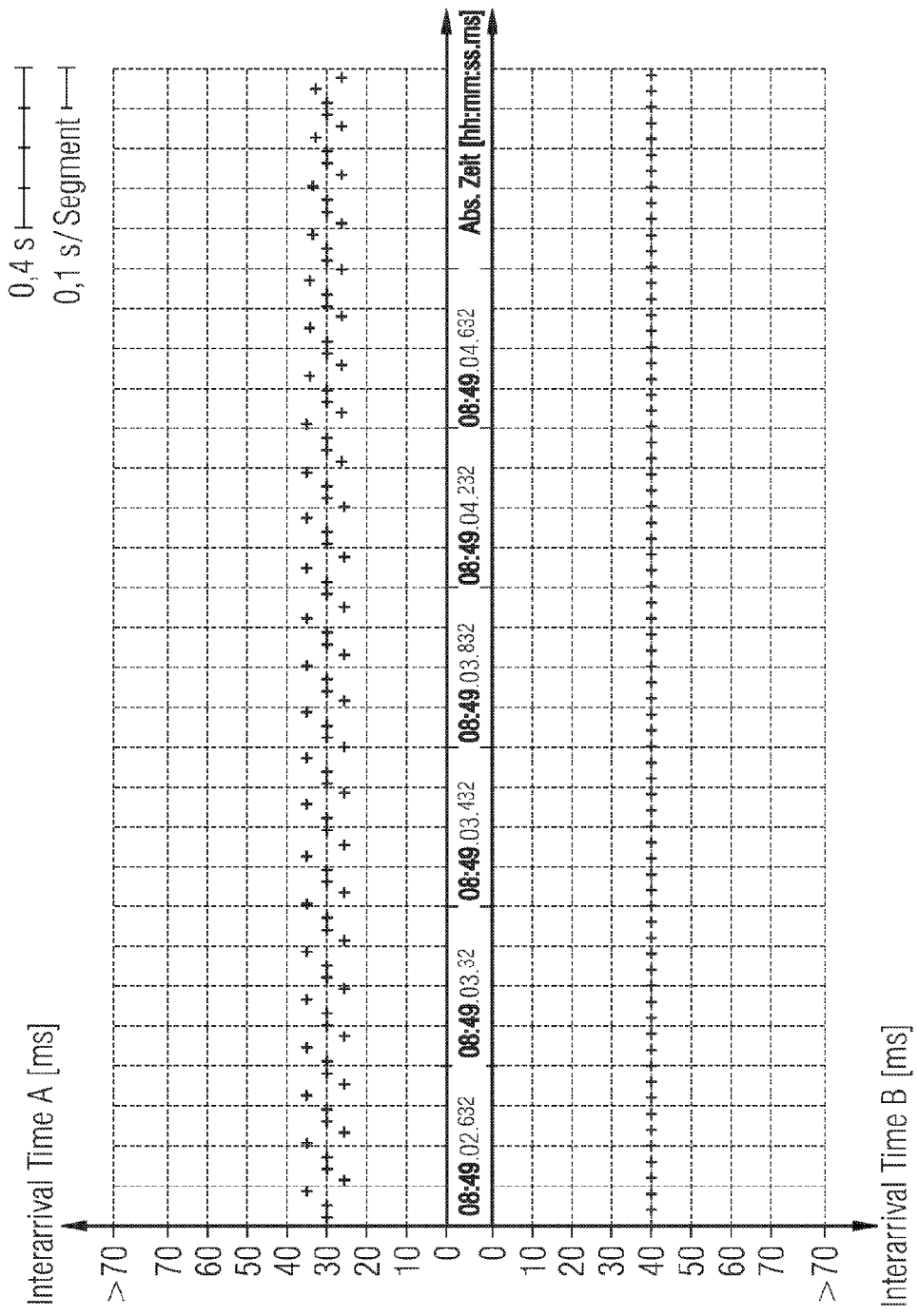
Figure 7:
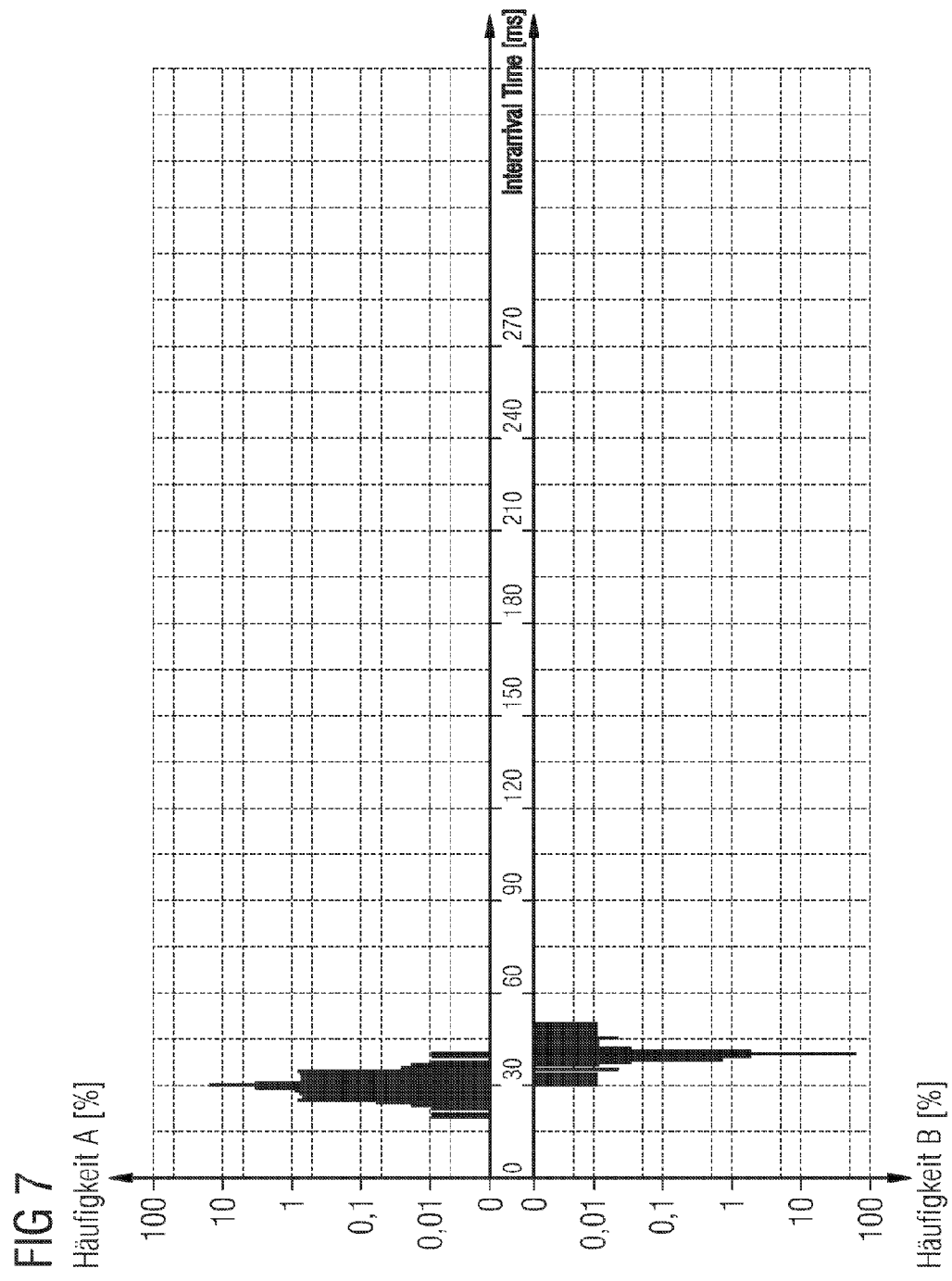
Figure 8:
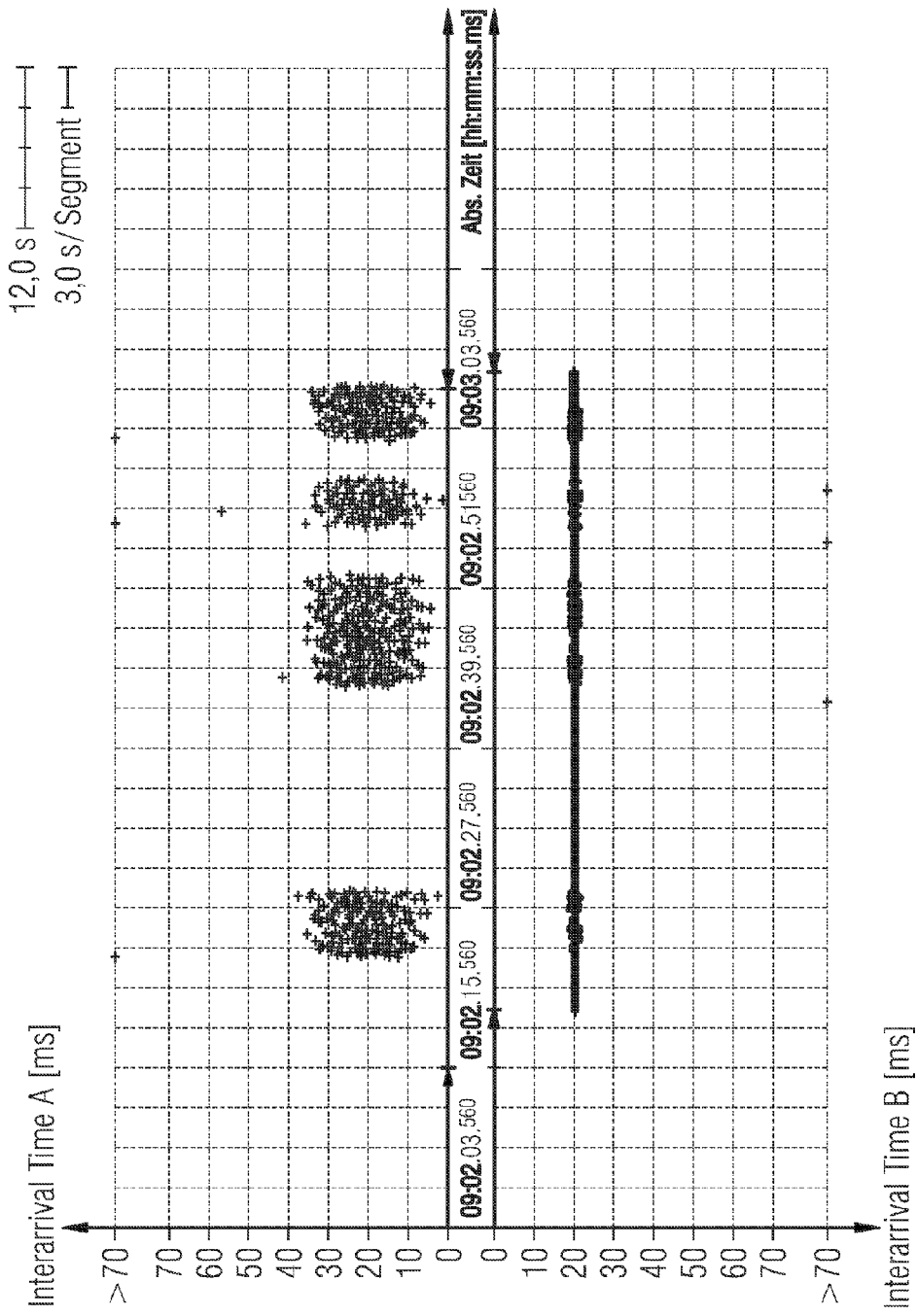
Figure 9:
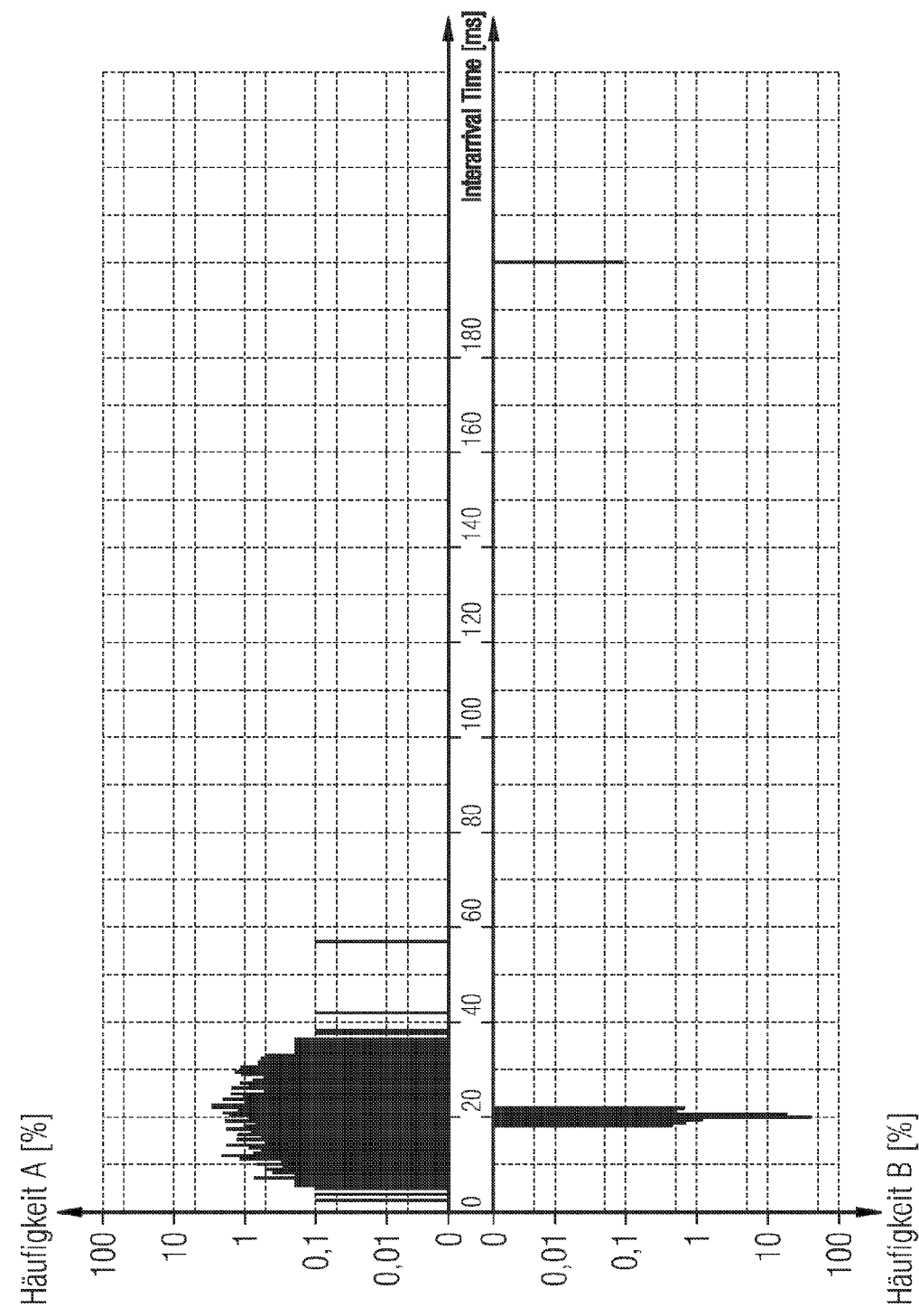
Figure 10:
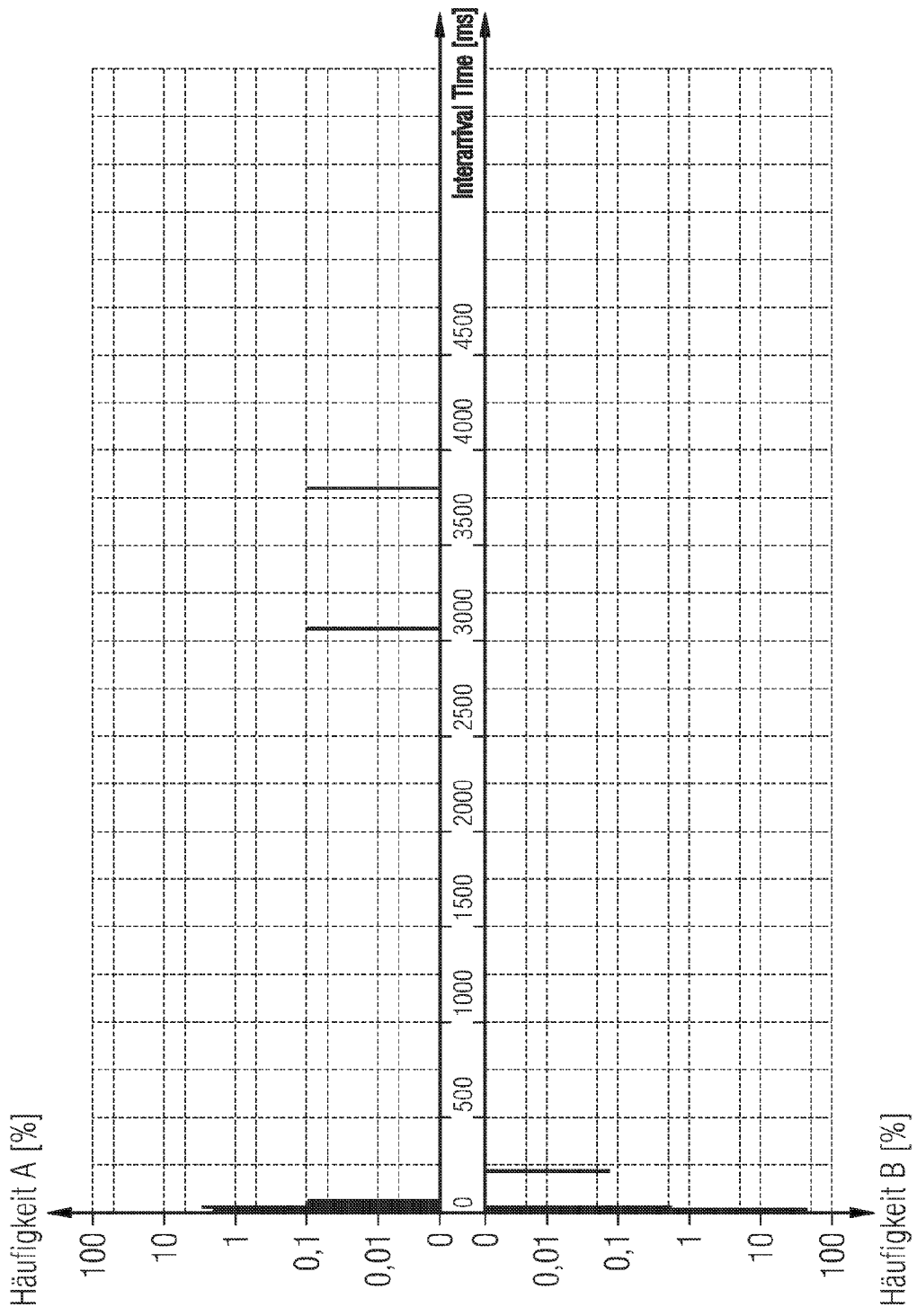
Figure 11:
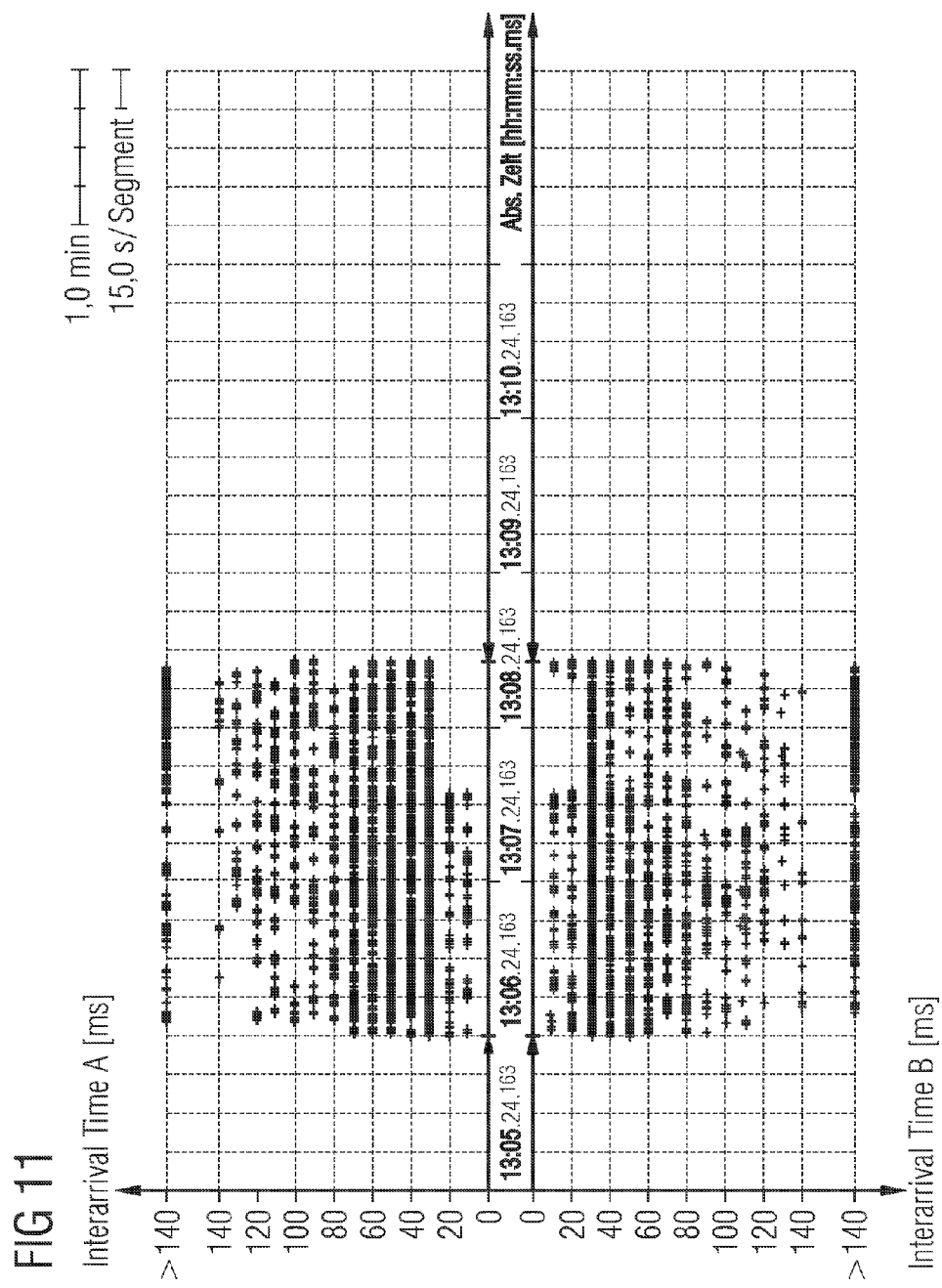
Figure 12:
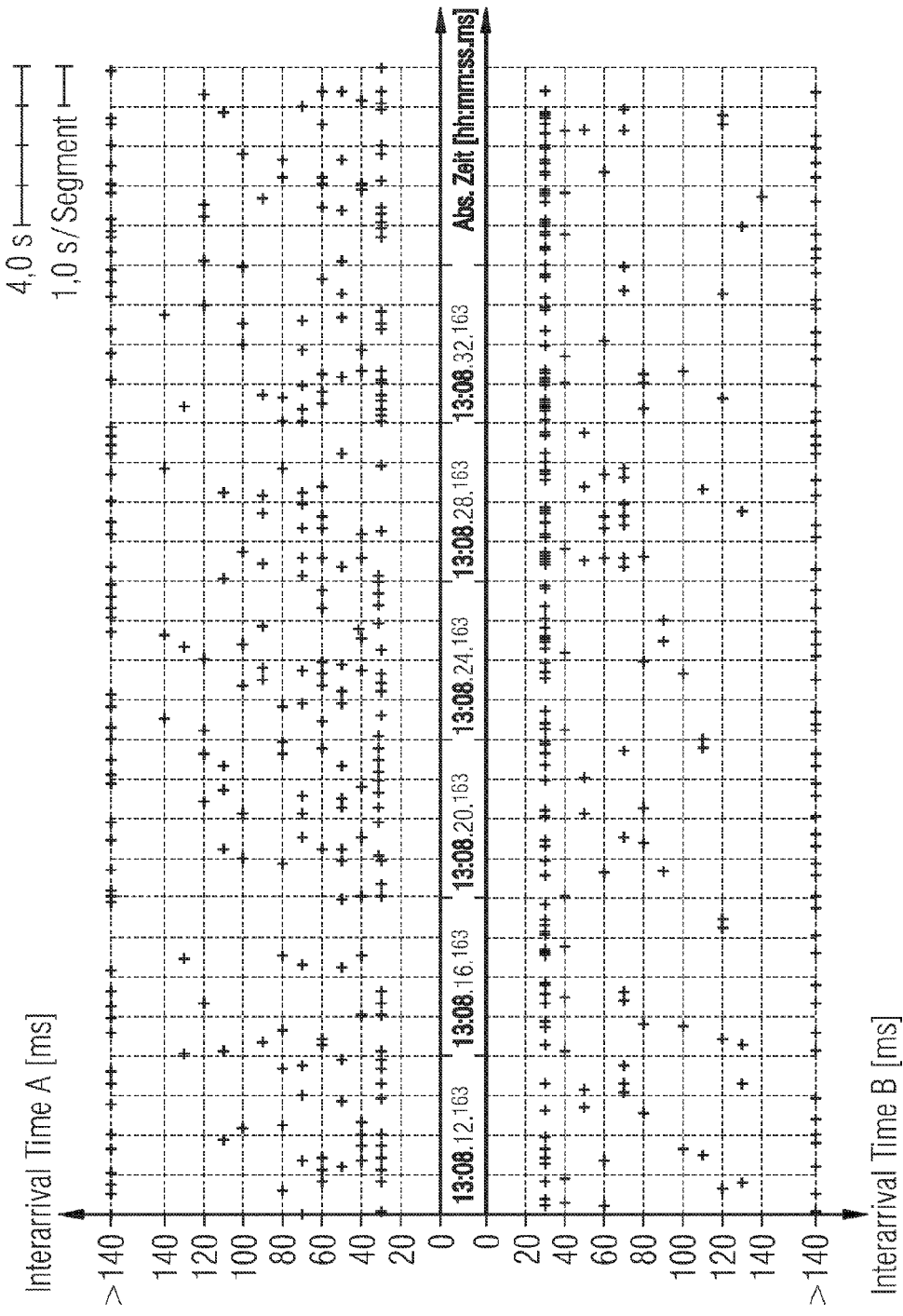
FIG. 12 shows the same real VoIP transmission, but with a changed time scale over the x-axis. The arrangement of individual RTP data packets in lines running in parallel to the ideal state becomes visible now.
Figure 13:
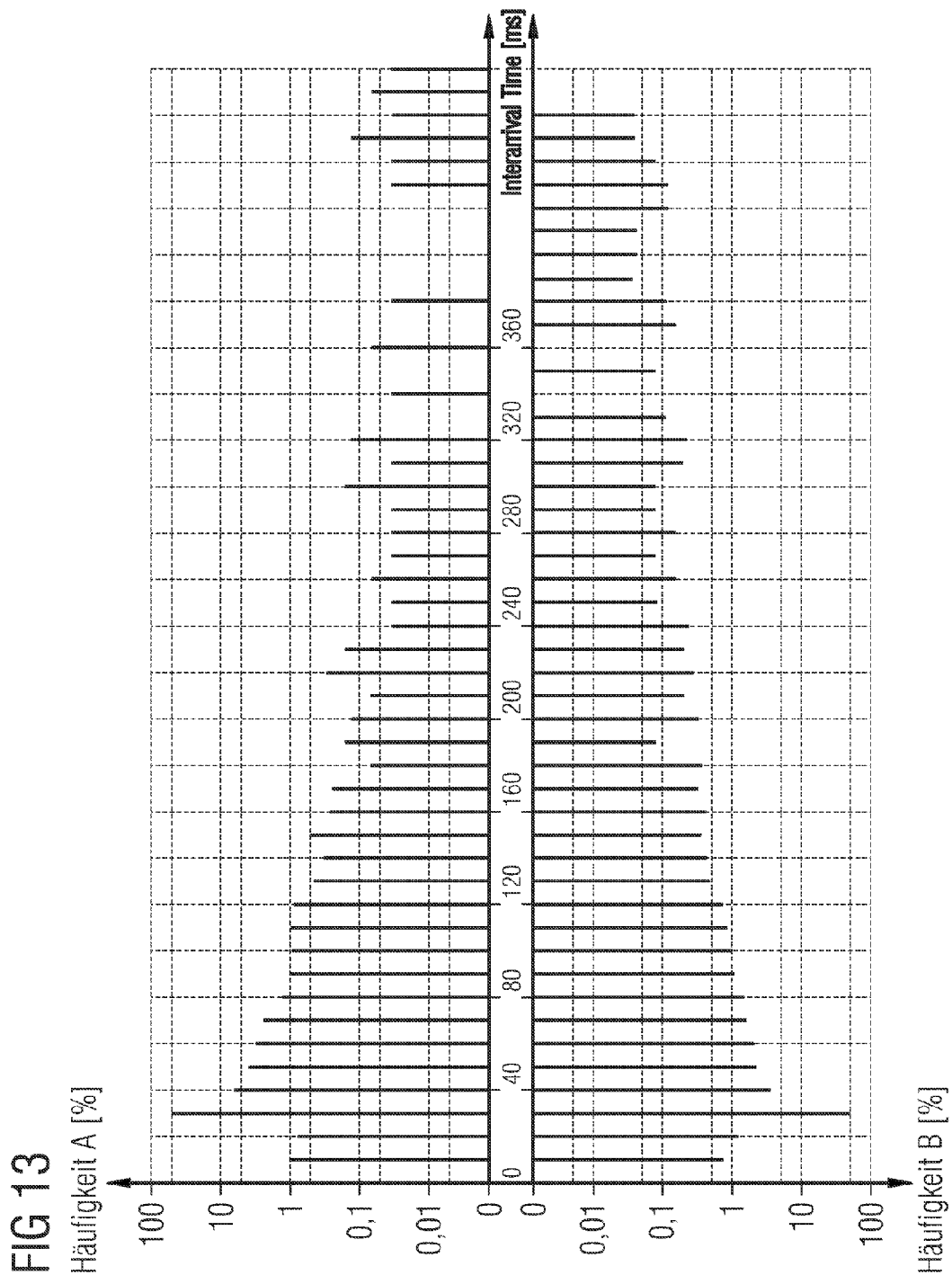
FIG. 13 shows the associated IAT histogram. Similar to the time diagrams in FIGS. 11 and 12, clearly visible lines for whole number multiples of the ideal state (interval of RTP packets sent without silence suppression) form here.
Figure 14:
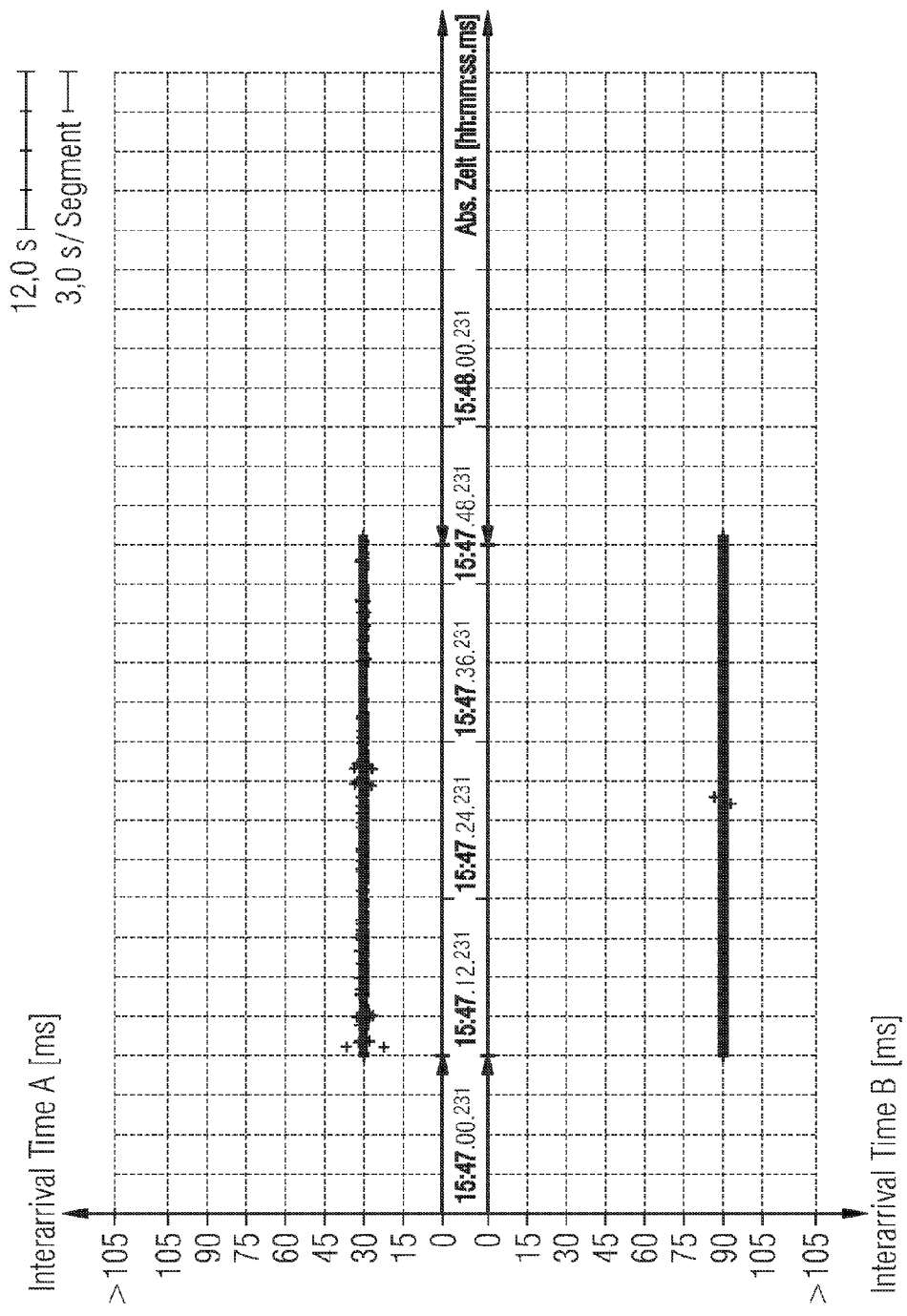
Figure 15:
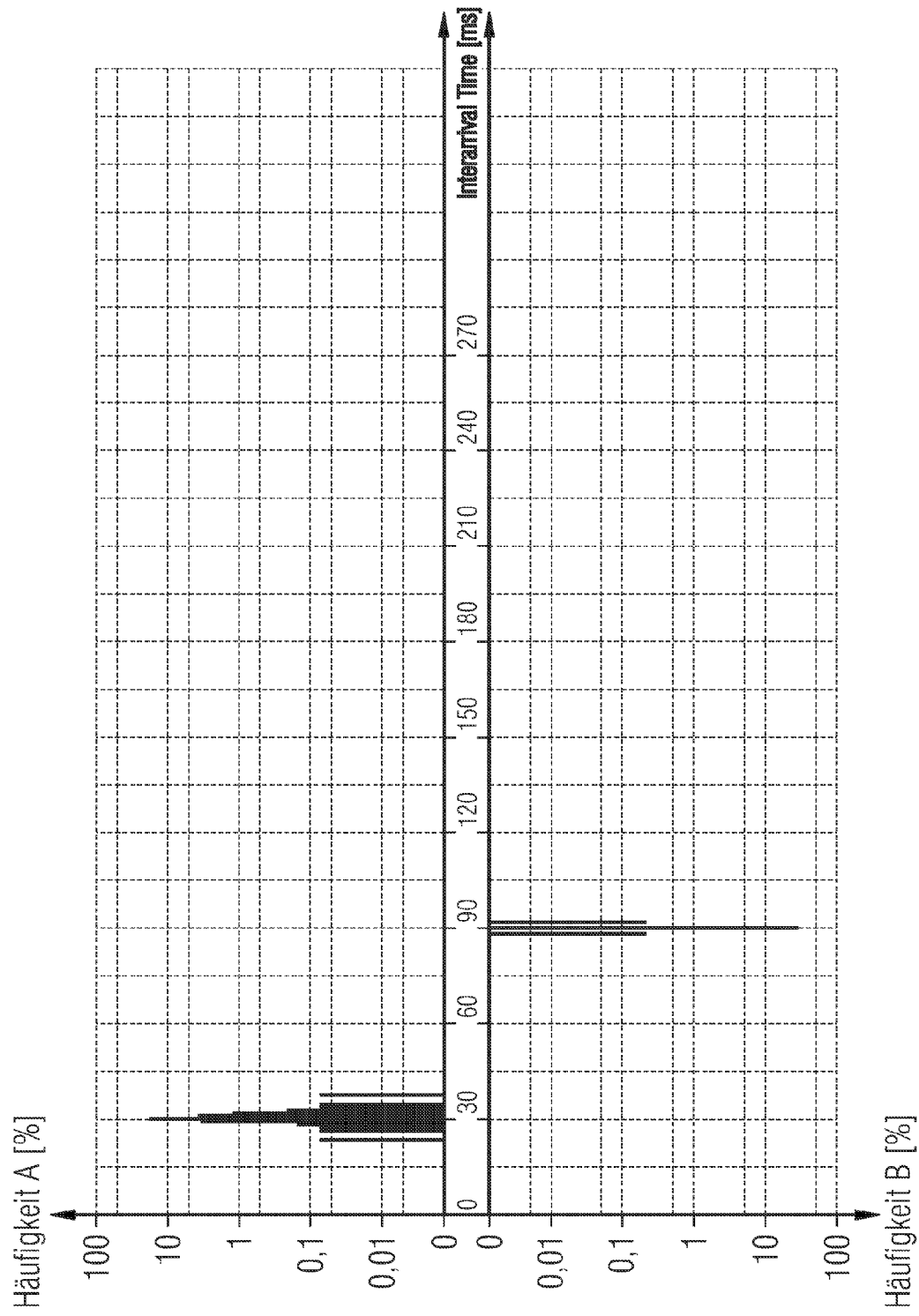

The normal state of a real VoIP transmission with a configuration error in one of the two communication devices is shown in FIGS. 14 and 15. FIG. 14 shows the IAT diagram of a real (nearly ideal) VoIP transmission with no packet loss and very low jitter. While the VoIP voice quality for both communication devices (A, B) can be judged excellent in terms of the VoIP transmission, the very high IAT of 90 ms for communication device B is very noticeable. The IAT is configured on the sender side and lies considerably above the value normally used, e.g. 20 ms, indicating a configuration error. To ensure trouble-free reception the size of the receiver buffer has to be appropriately selected on the receiving communication device (>90 ms). Because the size of the receiver buffer always responds additively in the overall budget of end-to-end delays between communication devices, even 90 ms is working close to the permissible threshold. However, receiver buffers are normally designed to compensate for larger deviations (e.g. 4 data packets=4*90 ms=360 ms). In these cases it is no longer possible to carry on a telephone dialog between communication devices.

FIG. 15 shows the associated IAT histogram. The histogram for communication device B exhibits a pattern shifted to 90 ms in a real transmission.

A normal state is thus presented in FIGS. 14 and 15, showing neither packet loss nor critical jitter. This is a high-quality VoIP transmission with a configuration error on the side of the sending communication device, which results in problems of speech quality (understanding).

If an IAT histogram shows a pattern in an otherwise similarly configured (e.g. 30 ms) system shifted completely towards higher values (>60 ms), but not otherwise disturbed, there is a configuration error on the side of the sending communication device.

Figure 16:
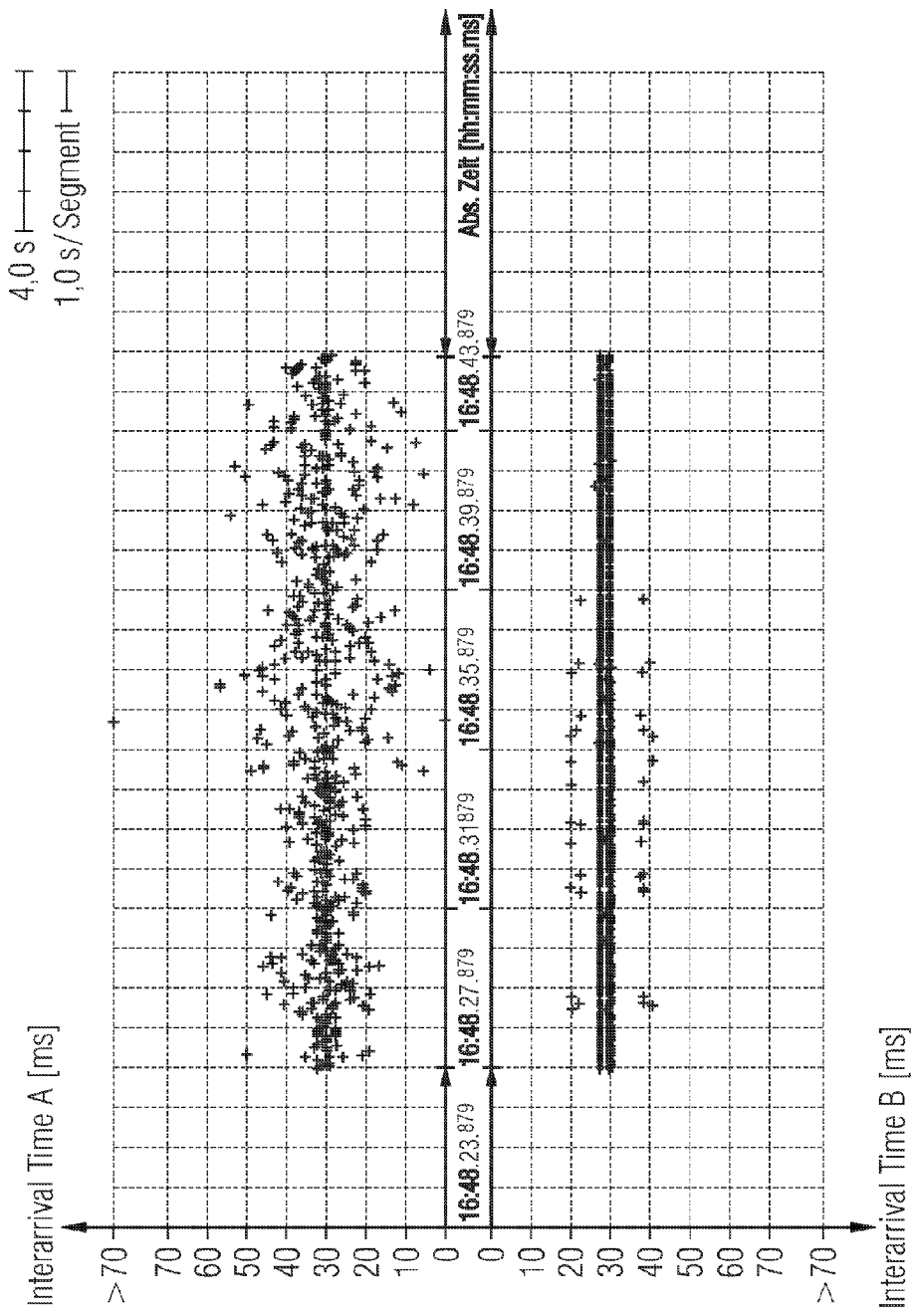
Figure 17:
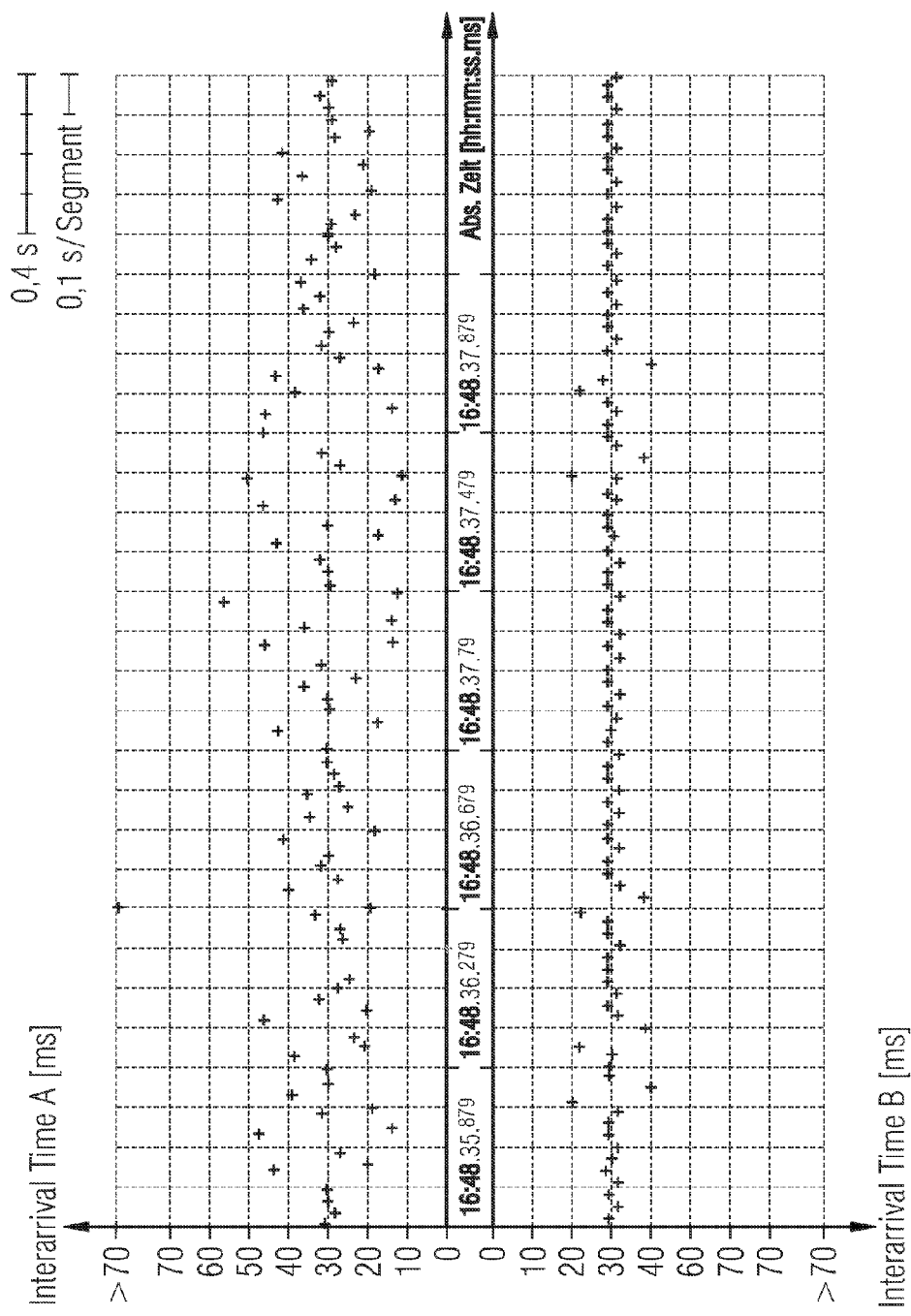
Figure 18:
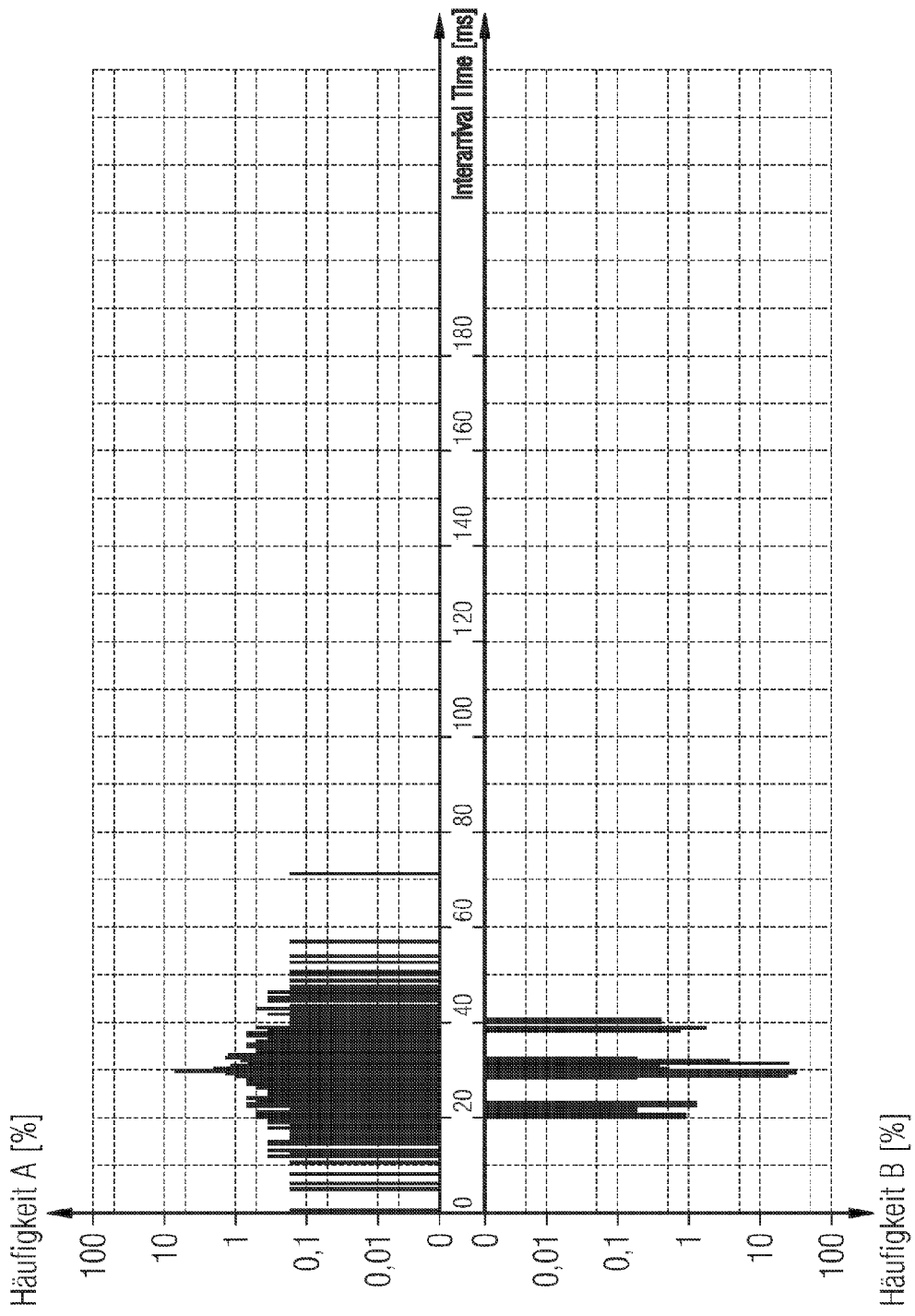

FIG. 16 to 18 show a real VoIP transmission with the presence of jitter. FIG. 16 shows the IAT diagram of a real VoIP transmission with no packet loss and clearly pronounced jitter for communication device A. The normal IAT state of 30 ms can only be assumed, which is why the IAT of the RTP data packets varies randomly around the normal state. This pattern characterizes an unstable VoIP data transmission route. FIG. 17 shows the same real VoIP transmission, where a larger time scale for the x-axis is however selected. The strong variance of individual RTP data packets for communication device A are now clearly discernable. FIG. 18 shows the associated IAT histogram. The strong variance for subscriber A is easily discernable in the histogram. The significant maximum (normal state) of 30 ms is still clearly discernable, but values vary greatly around this value.

Thus FIG. 16 to 18 show an error having to do with jitter with no packet loss. This situation can be identified in an IAT histogram in which a significant maximum exists as a indication of the normal state and the pattern of a large variance (jitter) is present, but without exceeding critical maximum values. These would otherwise be an indication of possible packet loss or silence suppression. The pattern can thus be clearly attributable as jitter.

Figure 19:
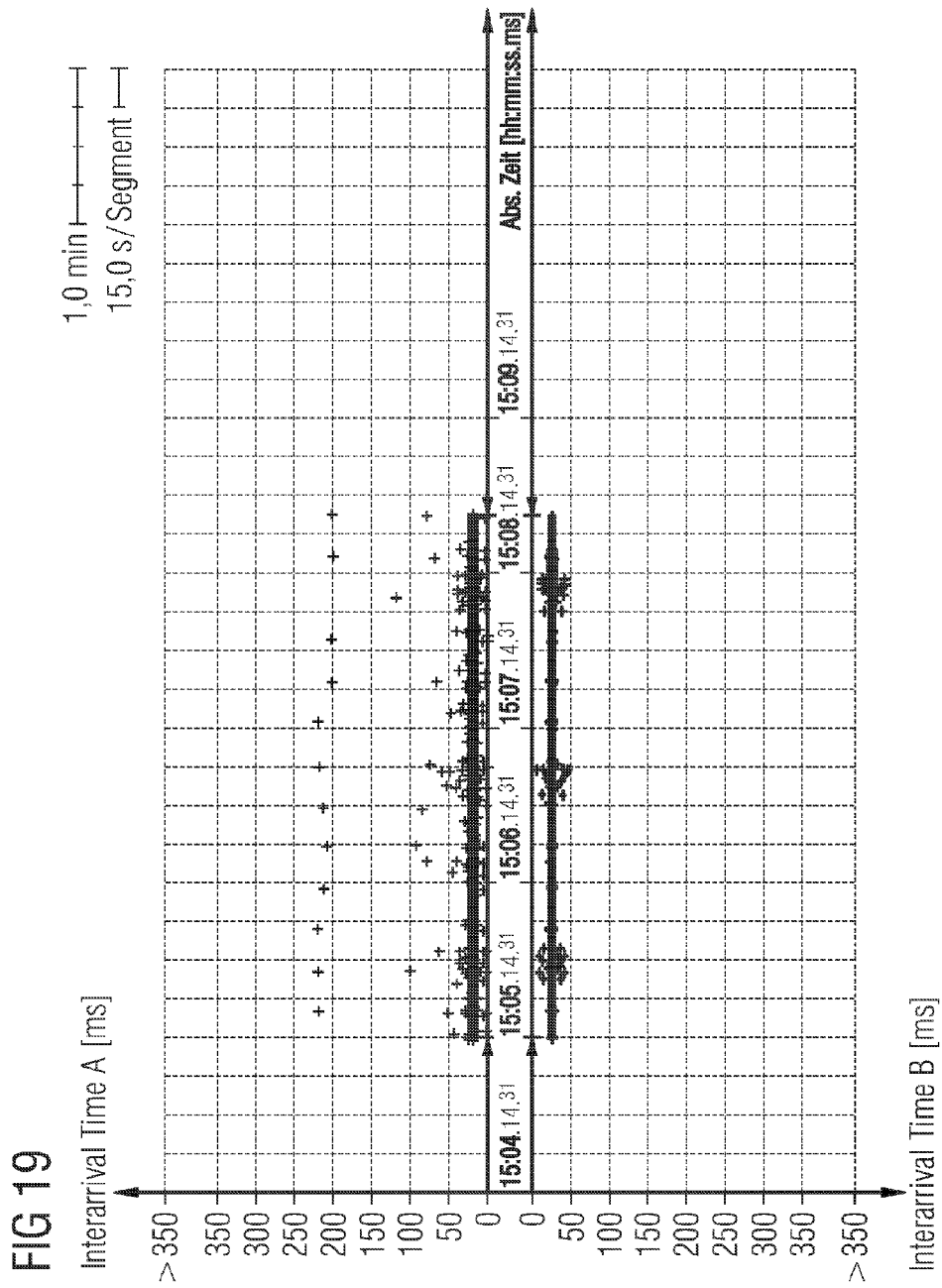
Figure 20:
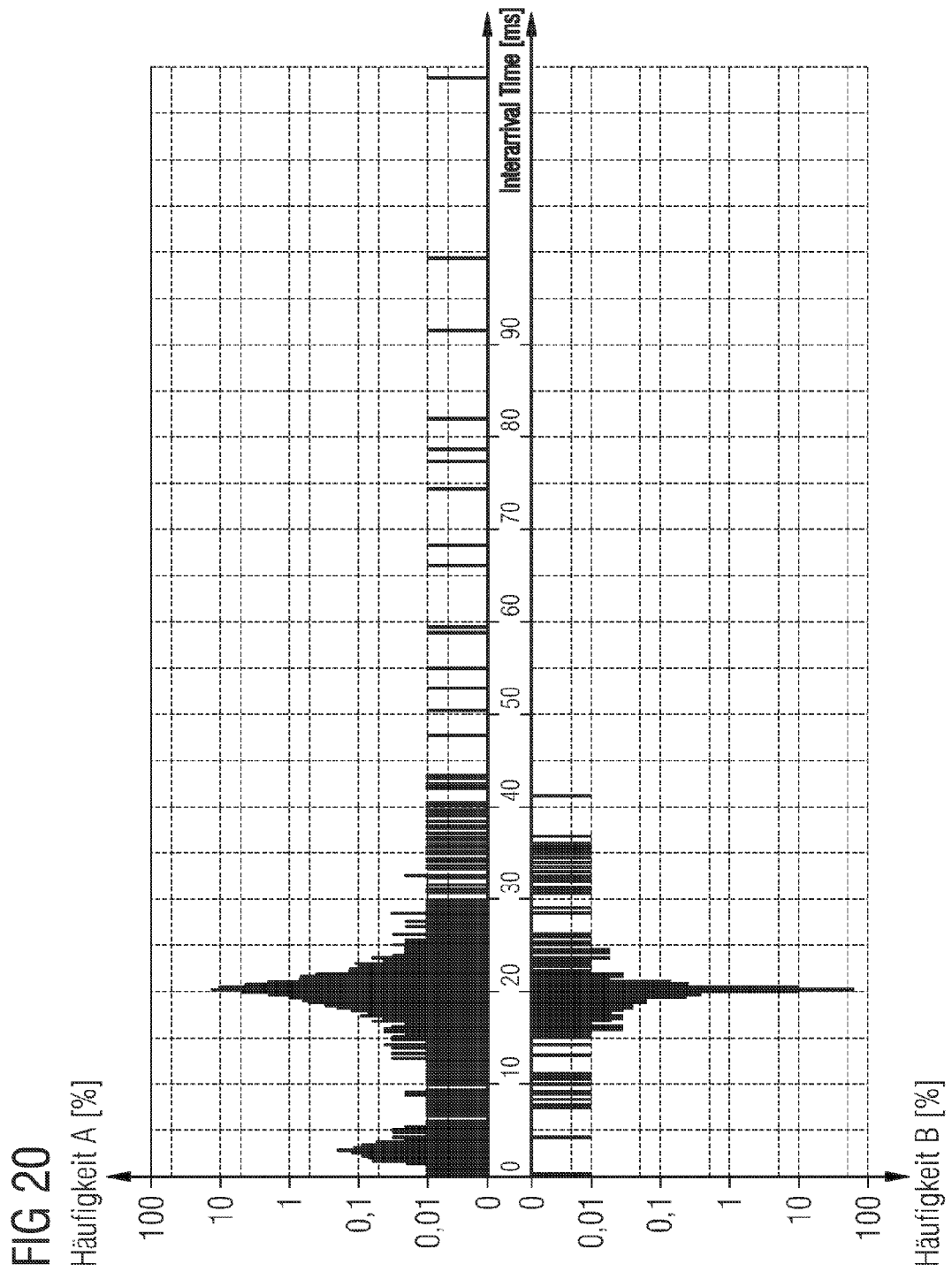

FIGS. 19 and 20 show a real VoIP transmission in which interference in the form of cyclic jitter is present. FIG. 19 shows the IAT diagram of the real VoIP transmission with no packet loss and clearly pronounced, periodic jitter for communication device A. Compared to continuously occurring jitter as in the previous example, in FIG. 16 to 18 there are clearly discernable cyclic deviations of individual data packets from the normal state here (in the same time interval; here approx. every 16 seconds). This cycle is always constant (approx. 16 seconds here), its value can however vary greatly, with the variation ranging between a few milliseconds and several seconds. With software-based clients in particular (e.g. VoIP clients running on computers) this effect can be greatly pronounced and correspond, for example, to the cycle length of the operating system's interrupts. This can, for example, be demonstrated with an arrangement of the supervisory computer immediately behind the affected software-based client, thus before data packets are transmitted over the data transmission network, but is also particularly discernable in the same way on the side of the receiving communication device. Because it can't continue to be assumed that there is a component in the data transmission network able to cause cyclic interferences, when cyclic interferences do occur it is highly likely that they are errors on the side of the sending communication device. The amplitude of the cyclic interference can, as in this example, be virtually constant, or—depending on the ratio (whole or non-whole number) of the cycle of the interference and the normal state of RTP packets being sent—and also slowly disappear (referred to as fading) and then reappear. In every case cyclic behavior can still be demonstrated on the side of the receiving communication device.

FIG. 20 shows the associated IAT histogram. In this IAT histogram the significantly elevated values of the IAT can be identified, but not its cyclical character.

In principle this embodiment example (with few exceptions) is an uninterrupted VoIP transmission. The cyclic, selective jitter behavior indicates a high probability that the cause does not lie in the data transmission network, but on the side of the sending communication device. This can, for example, be produced by an interrupt of the operating system or other cyclically running internal processes of the sender.

If an IAT histogram exhibits critically elevated values that stand out against the rest of the pattern (jitter) this may be a matter of cyclic interference. Thus an additional criteria to check in an IAT diagram is whether a cyclic behavior (same measurement timestamp interval of interference, i.e. the same interval on the x-axis) of jitter can be detected. If the cyclic behavior is specially discerned in individual RTP packets, with high probability the interference lies on the sender side.

Figure 21:
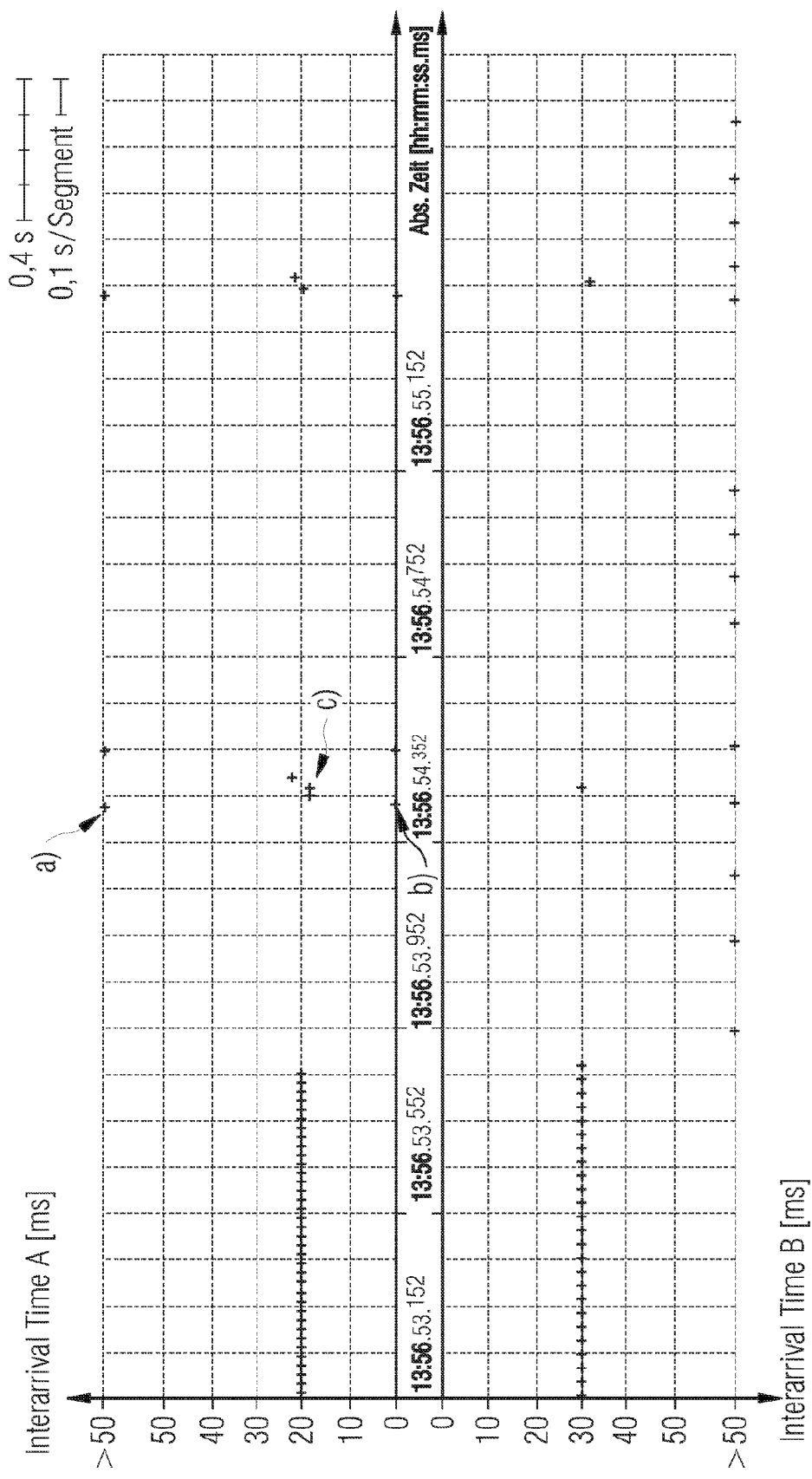
Figure 22:
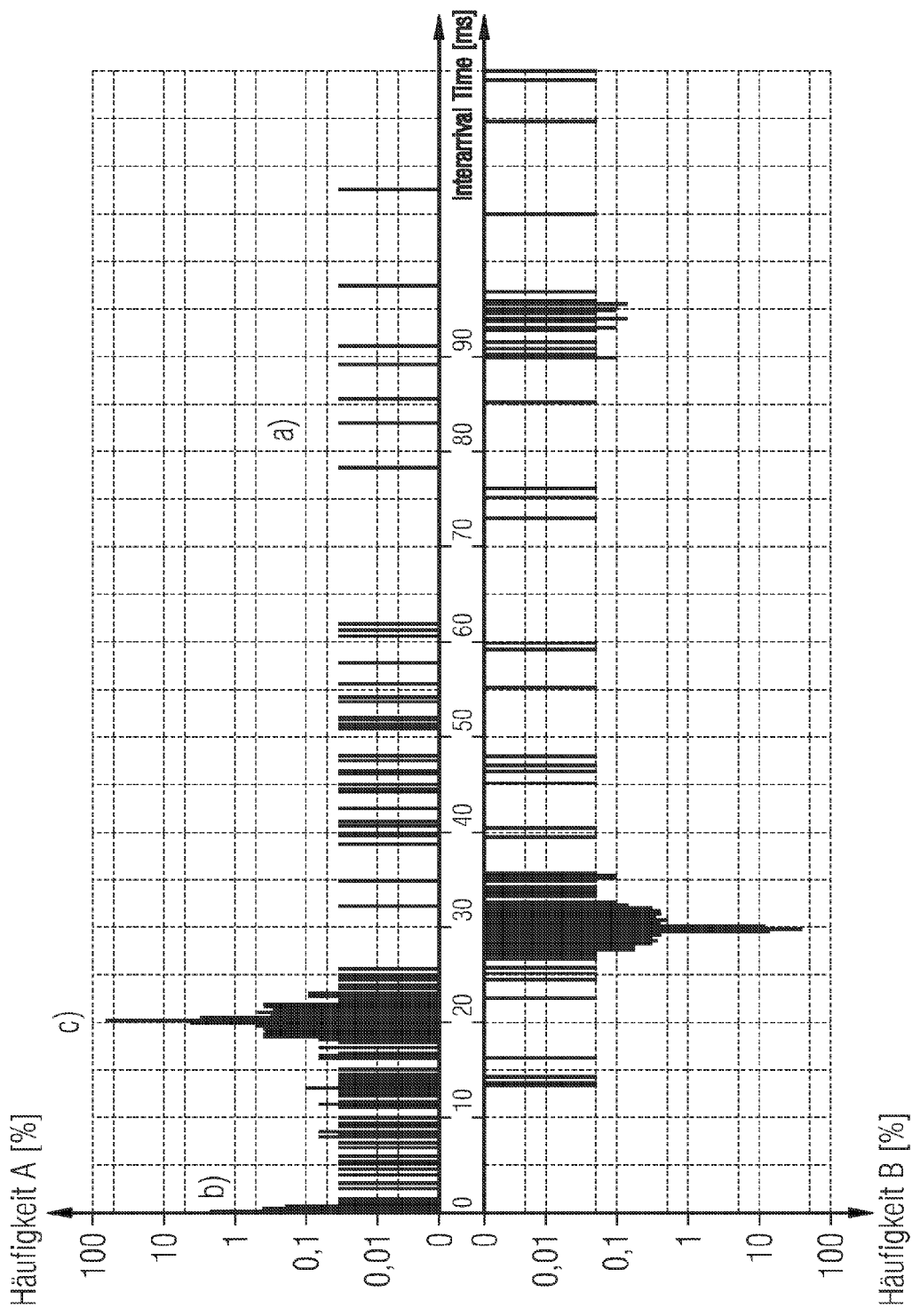

FIGS. 21 and 22 show a real VoIP transmission in which interference in the form of singular jitter is present. FIG. 21 shows the IAT diagram of the real VoIP transmission with no packet loss, no silence suppression, and clearly elevated IAT, which is thus a matter of jitter. This jitter occurs abruptly in a otherwise undisturbed VoIP transmission with an IAT of 20 ms as the normal state on communication device A. The RTP data packet (labeled a in the Fig.) following the gap caused by jitter consequently has an accordingly high IAT. After the data packet (a) several RTP data packets (cf. b) with an IAT approaching zero (referred to as NZ-IAT or near zero IAT) are registered. Due to the extremely low time interval the RTP data packets appear in this illustration as one packet. Then normal transmission (cf. c) continues at 20 ms. The NZ-IATs (b) are the consequence of buffering taking place in the data transmission network, e.g. due to overload. Because the data transmission network has no RTP stack and thus is not able to reconstruct the original, normal IAT of 20 ms again after buffering, all RTP data packets are forwarded at the highest possible speed to the recipient until the buffer is cleared. The NZ-IAT is thus a clear indication of buffering taking place in the components of an IAT data transmission network.

FIG. 22 shows the associated IAT histogram. Here, in addition to the normal state (cf. c in FIG. 22) and the extreme values (cf. a in FIG. 22), the NZ-IAT (cf. b in FIG. 22) is clearly discernable.

In this embodiment example it is clearly a matter of interference caused by the buffering of an RTP data stream in the data transmission network with subsequent rapid sending of data packets without reconstruction of the normal IAT. If an IAT histogram thus exhibits an IAT value approaching zero (NZ-IAT) this is a clear indication that data packets in the data transmission network are being buffered. This case can be clearly differentiated from the low, but not approaching zero IAT values of the previous embodiment example as shown in FIGS. 19 and 20. As an additional criteria the IAT diagram, which exhibits several consecutive NZ-IAT packets, can also be drawn on for error detection.

Figure 23:
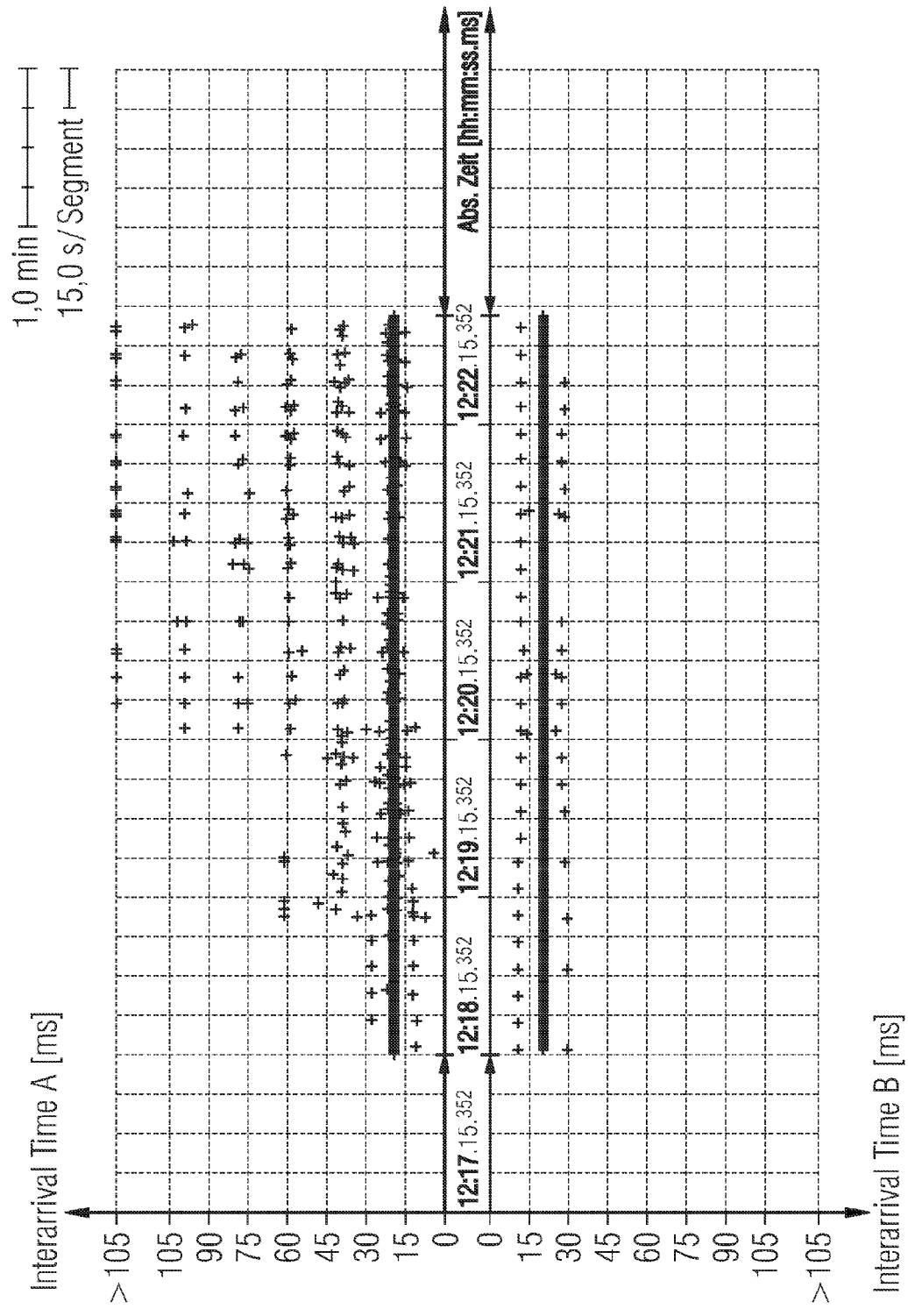
Figure 24:
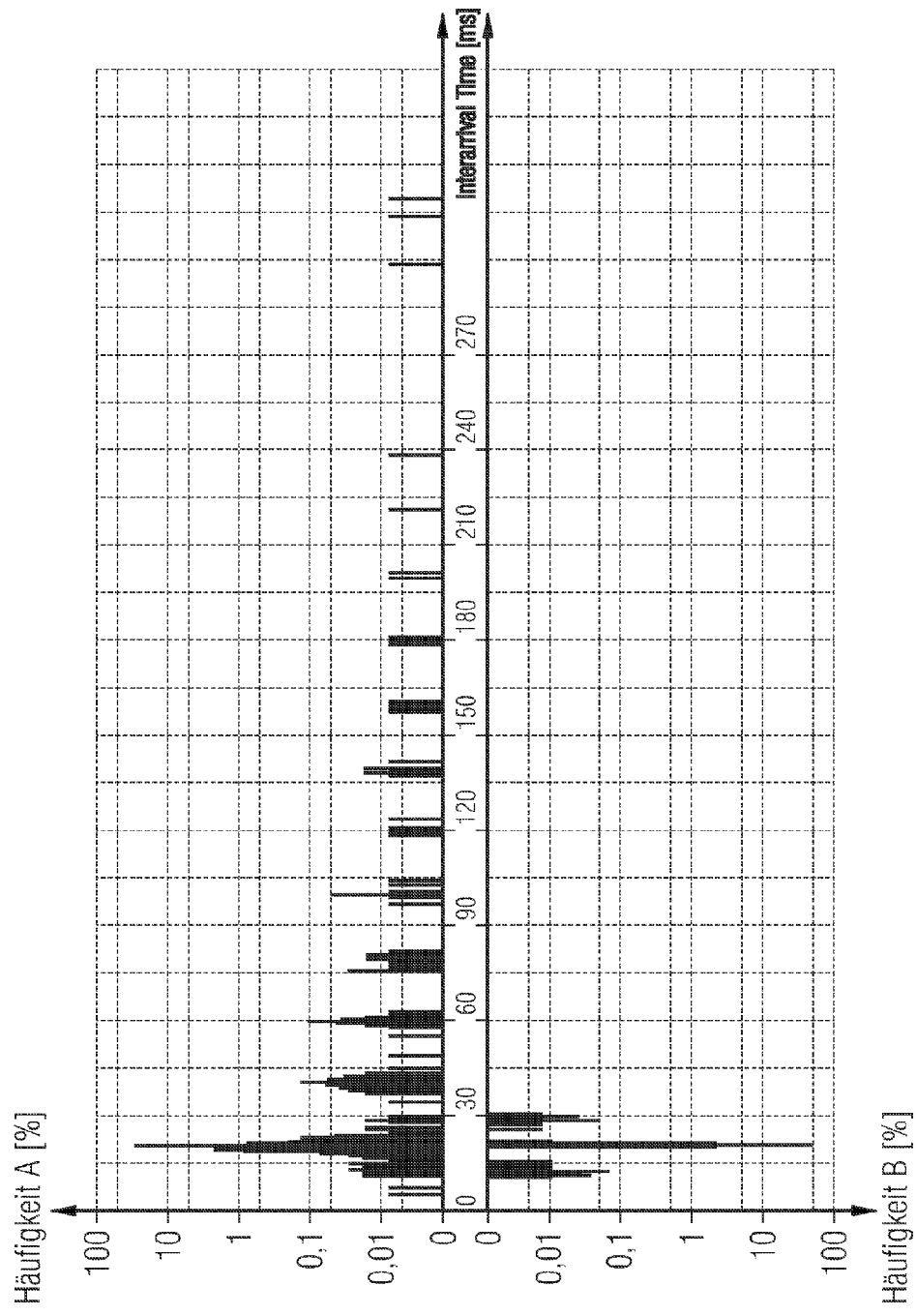
Figure 25:
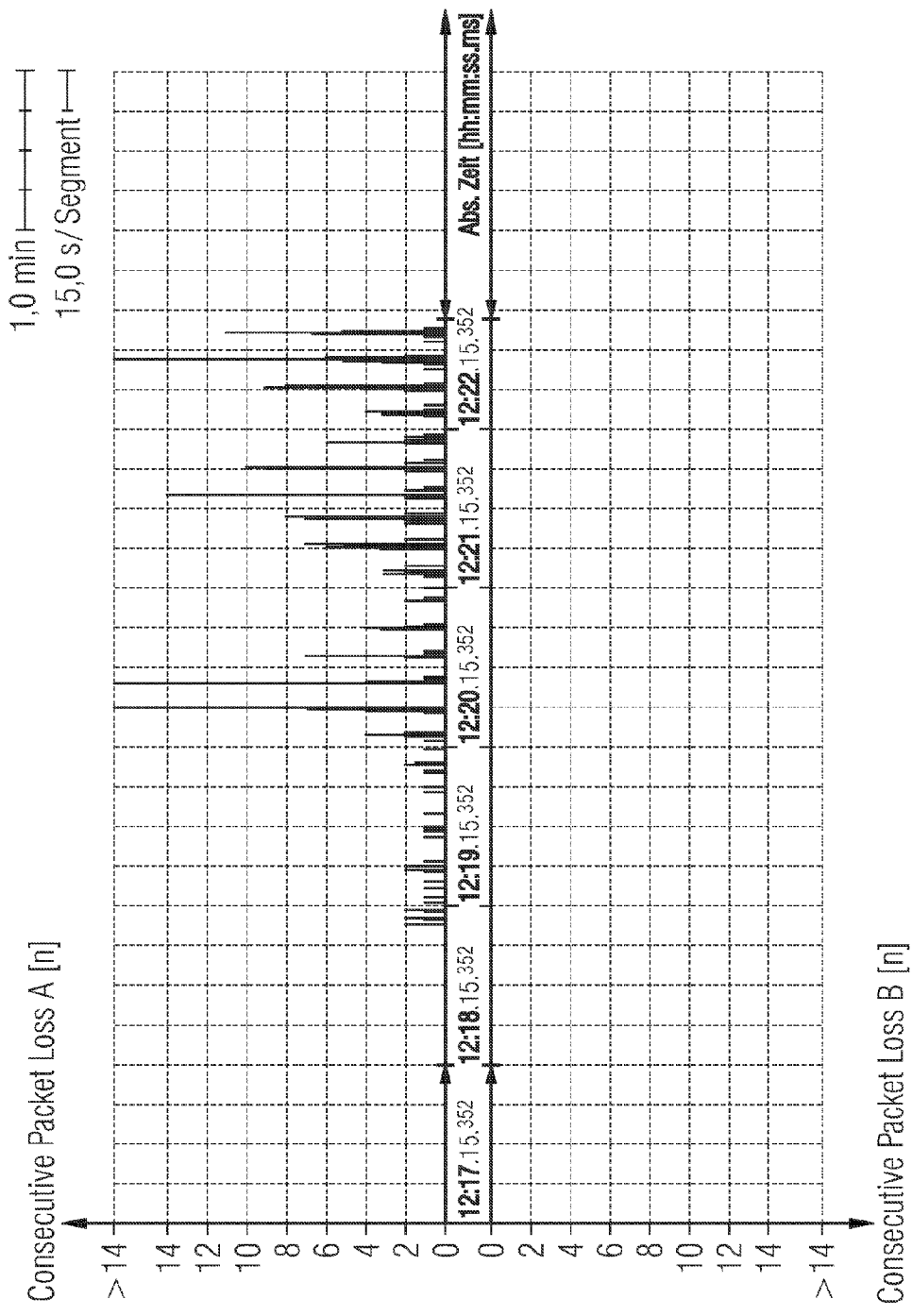

As an addition embodiment example FIG. 23 to 25 show a real VoIP transmission in which interference due to packet loss is present. FIG. 23 shows the IAT diagram of a real VoIP transmission in which high IAT values frequently occur. Here it is not initially apparent whether this is a matter of packet loss (loss of one or more RTP packets) or jitter. FIG. 24 shows the associated IAT histogram. In addition to the normal pattern of 20 ms, other, smaller patterns can be seen here that are whole number multiples of the normal state (40 ms, 60 ms, etc.) distributed similar to "harmonic waves". All patterns exhibit the same expansion due to normal jitter. Yet this suggests packet loss here. The final check is done by evaluating a packet loss diagram (FIG. 25), which is confirmation of packet loss.

In this embodiment example packet loss is thus present, combined with slight jitter.

If, apart from a pattern for the normal state, an IAT histogram exhibits other, similar "harmonic waves" in whole number multiples of the normal state, suspicion of packet loss exists. Confirmation is done by comparing the IAT diagram with a packet loss diagram or the packet loss histogram.

Pattern recognition and thus the error analysis can be done automatically by evaluating the diagrams and/or histograms or the mathematical data models corresponding to these diagrams and histograms. A histogram can, for example, be described digitally by a data vector with an appropriate number of entries. Beyond this algorithms for pattern recognition and the necessary computers for it exist.

The invention thus permits error analysis which can identify both the cause of the error (e.g. IAT, jitter, packet loss, etc.) and the location of the error (components of the data transmission network, RTP stack of the sender, configuration of the sender, etc.). By doing this it is possible to classify errors (e.g. error in a sending communication device or error in a data transmission network). The reference patterns, interrelationships and/or thresholds, etc. required for pattern recognition can, for example, be made available to the supervisory computer. The reference patterns and/or thresholds can, for example, be identified by experiments.

The invention claimed is:

1. A method comprising using a computer to analyze a data stream of VoIP (Voice over IP) packets sent from a communication device, including using the computer to receive the VoIP packets, compute receive interarrival times of consecutive received VoIP packets, form a histogram or diagram of the receive interarrival times, and perform pattern recognition on the histogram or diagram to identify any sender problems in the communication device.

2. A method according to claim 1, wherein the communication device has an RTP (Realtime Transport Protocol) stack.

3. A method according to claim 1, wherein each receive interarrival time is computed as a difference in receipt times between two consecutive received packets having consecutive sequence numbers.

4. A method according to claim 3, wherein receipt time of each VoIP packet is indicated by a measurement timestamp.

5. A method according to claim 1, wherein the packets contain real voice data.

6. A method according to claim 1, wherein the histogram includes a frequency distribution of the interarrival times.

7. A method according to claim 1, wherein the diagram includes a temporal progression of the interarrival times.

8. A method according to claim 1, wherein the pattern recognition identifies configuration of the communication device as a sender problem.

9. The method according to claim 8, wherein a sender problem caused by the configuration is recognized as a complete shift of an undisturbed interarrival time pattern towards higher values.

10. A method according to claim 1, wherein the pattern recognition identifies a network problem instead of a sender problem.

11. The method according to claim 10, wherein the network problem of lower bandwidth is recognized as discrete interarrival time whole number values with no packet loss.

12. The method according to claim 10, wherein packet loss is recognized as harmonics of a normal state of the interarrival times.

13. A method according to claim 1, wherein the pattern recognition identifies an RTP (Realtime Transport Protocol) stack in the communication device as a sender problem.

14. The method according to claim 13, wherein a problem with an RTP stack of the communication device is recognized as NZ-IAT (near zero interarrival time) in the histogram.

15. A method according to claim 1, wherein the pattern recognition identifies an operating system of the communication device as a sender problem.

16. A method according to claim 1, wherein whether components involved with transmission of the data stream are able to process an RTP (Realtime Transport Protocol) data packet is ascertainable as a cause of a sender problem.

17. The method according to claim 15, wherein a problem with an operating system of the communication device is recognized as cyclic jitter in the histogram.

18. A method according to claim 1, wherein the pattern recognition identifies at least one of an operating system of the communication device, configuration of the communication device, and an RTP (Realtime Transport Protocol) stack of the communication device as a sender problem.

19. A method according to claim 1, wherein the data stream is also analyzed at more than one place of measurement.

20. The method of claim 1, wherein the pattern recognition reveals sender and receiver problems that impact VoIP speech quality.

21. The method of claim 1, wherein the histogram or diagram is formed from the interarrival times of the received packets without using corresponding transmit times of the communication device.

22. The method of claim 1, wherein the computer provides a single measurement point for the interarrival times.

23. An article comprising non-transitory computer-readable memory encoded with computer-readable code that causes a computer to monitor a data network for VoIP packets from a sending communication device to a receiving communication device, compute interarrival times of consecutive VoIP (Voice over IP) packets, form a histogram or diagram of the interarrival times, and perform pattern recognition on the histogram or diagram to determine whether the sending device was a root cause of a transmission error, each interarrival time computed as a difference in receipt times between two consecutive packets.

24. The article according to claim 23, wherein the pattern recognition identifies insufficient bandwidth and/or finite size of a buffer store of active network components as the root cause instead of the sending device.

25. The article according to claim 23, wherein the pattern recognition is performed on the diagram, which includes a temporal progression of the interarrival times.

26. The article according to claim 23, wherein the pattern recognition is performed on the histogram, which includes a frequency distribution of the interarrival times.

27. The article according to claim 26, wherein at least one of operating system of the sending communication device, configuration of the sending communication device, and a stack of the sending communication device are ascertainable from the pattern recognition.

28. The article according to claim 26, wherein a problem with an RTP stack of the sending device is ascertainable from the pattern recognition.

29. The article according to claim 23, wherein a problem with an operating system of the sending device is ascertainable from the pattern recognition.

30. The article according to claim 23, wherein a problem with configuration of the sending device is ascertainable from the pattern recognition.

31. A communication system comprising a supervisory computer programmed to monitor a data network for VoIP (Voice over IP) packets sent from a sending communication device to a receiving communication device, compute receive interarrival times of consecutive packets, form at least one of a histogram and a diagram of the receive interarrival times, and perform pattern recognition on the diagram or histogram to identify any sender problems in the sending device.

32. The system according to claim 31, wherein a receipt time is indicated by a measurement timestamp.

33. The system according to claim 31, wherein each receive interarrival time is computed as a difference in receipt times between two consecutive received packets having consecutive sequence numbers.

34. The system according to claim 31, wherein the diagram is a temporal progression of the interarrival times and wherein the histogram is a frequency distribution of the interarrival times.

35. The system according to claim 34, wherein the pattern recognition is performed on the histogram.

36. The system according to claim 34, wherein the pattern recognition is performed on the diagram.

37. The system according to claim 31, wherein the pattern recognition identifies configuration of the sending device as a sender problem.

38. The system according to claim 31, wherein the pattern recognition identifies an operating system of the sending device as a sender problem.

39. The system according to claim 31, wherein at least one of operating system of the sending communication device, configuration of the sending communication device, and a stack of the sending communication device are ascertainable as the sender problem.

40. The system according to claim 31, wherein the pattern recognition identifies an RTP (Realtime Transport Protocol) stack in the sending device as a sender problem.

41. The system according to claim 31, wherein the pattern recognition identifies insufficient bandwidth and/or finite size of a buffer store of active network components.

42. The system according to claim 31, wherein the pattern recognition reveals errors that caused impact on VoIP speech quality.

43. A method comprising using a computer to:
receive VoIP (Voice over IP) packets;
compute receive interarrival times of consecutive received VoIP packets, each receive interarrival time computed as a difference in receipt times between two consecutive received packets having consecutive sequence numbers;
form a histogram or diagram of the receive interarrival times; and
perform pattern recognition on the histogram or diagram to identify a cause of an error in a sending communication device;
wherein an operating system of the sending communication device, configuration of the sending communication device, and a stack of the sending communication device are ascertainable as the cause of the error.

* * * * *